United States Patent [19]

Nigam

[11] Patent Number: 5,377,060
[45] Date of Patent: Dec. 27, 1994

[54] ULTRA SLIM DATA STORAGE MODULE UTILIZING PLURAL FLEXIBLE DISKS

[75] Inventor: Anil Nigam, Cupertino, Calif.

[73] Assignee: Antek Peripherals, Inc., Cupertino, Calif.

[21] Appl. No.: 939,182

[22] Filed: Sep. 2, 1992

[51] Int. Cl.⁵ .............................................. G11B 5/012
[52] U.S. Cl. ................... 360/99.01; 360/98.02
[58] Field of Search ................ 360/99.01, 98.02, 98.03

[56] References Cited

U.S. PATENT DOCUMENTS

| | | | |
|---|---|---|---|
| 3,398,870 | 8/1968 | Mullan et al. | 226/97 |
| 3,863,266 | 1/1975 | Hoshino | 360/99.01 X |
| 4,151,573 | 4/1979 | Tandon et al. | 360/104 |
| 4,315,292 | 2/1982 | Kronfeld | 360/122 |
| 4,414,592 | 11/1983 | Losee et al. | 360/102 |
| 4,967,297 | 10/1990 | Okita | 360/99.01 X |
| 4,974,106 | 11/1990 | White et al. | 360/102 |
| 5,189,574 | 2/1993 | Imamura | 360/99.01 X |

FOREIGN PATENT DOCUMENTS 9014661  5/1990  WIPO .

Primary Examiner—A. J. Heinz
Attorney, Agent, or Firm—Townsend and Townsend Khourie and Crew

[57] ABSTRACT

The invention provides a high-capacity, high-speed data storage device which is extremely compact, rugged and economical. In a preferred embodiment, the data storage device comprises a housing defining a sealed enclosure, a motor mounted within the housing having a rotatable spindle, a flexible disk non-removably mounted to the spindle, and a read-write head disposed within the housing over a first surface of the disk for reading or writing data thereon. By the use of a flexible disk of a material such as Mylar, the housing has an extremely small height, preferably less than 5.0 mm, and the device is economical and rugged. At the same time, high storage capacity and speed is attained by the use of a flying head which reads or records data without contacting the disk. In preferred embodiments, multiple disks and/or multiple heads may be employed for extremely large data storage capacities in ultra-compact devices.

14 Claims, 17 Drawing Sheets

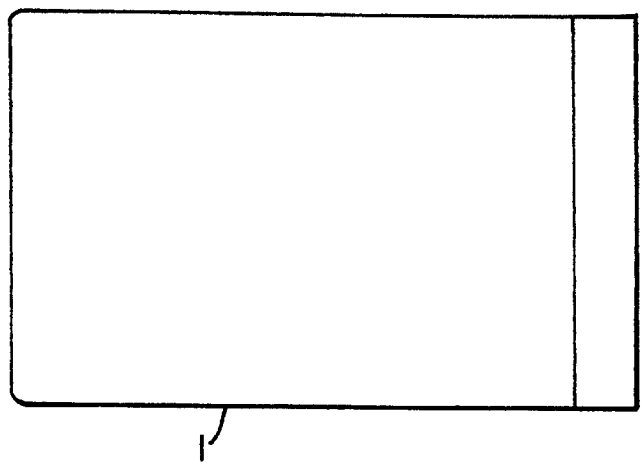
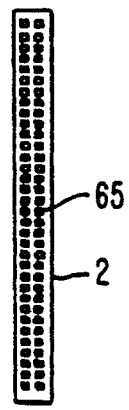
FIG. 1A.  FIG. 1B.
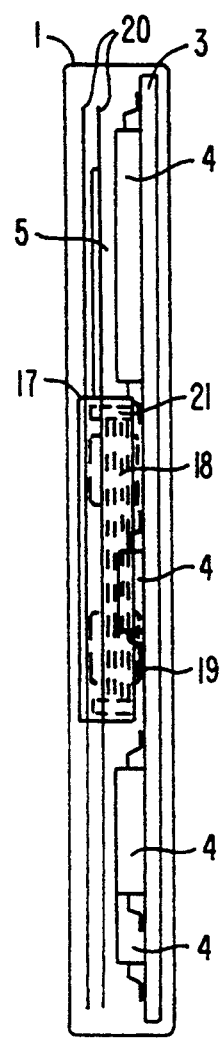
FIG. 2B.

$$\text{STIFFNESS} \cong \frac{E t^2}{\rho w^2 (3+\nu)(1-\nu^2) r^4}$$

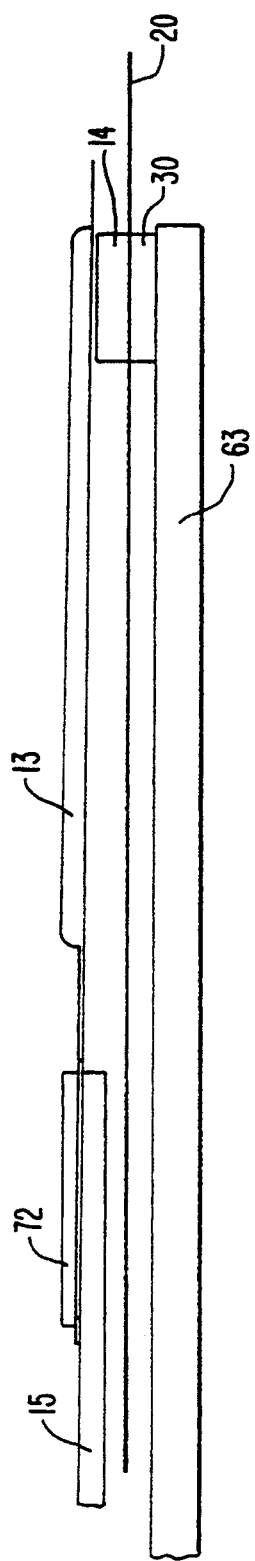
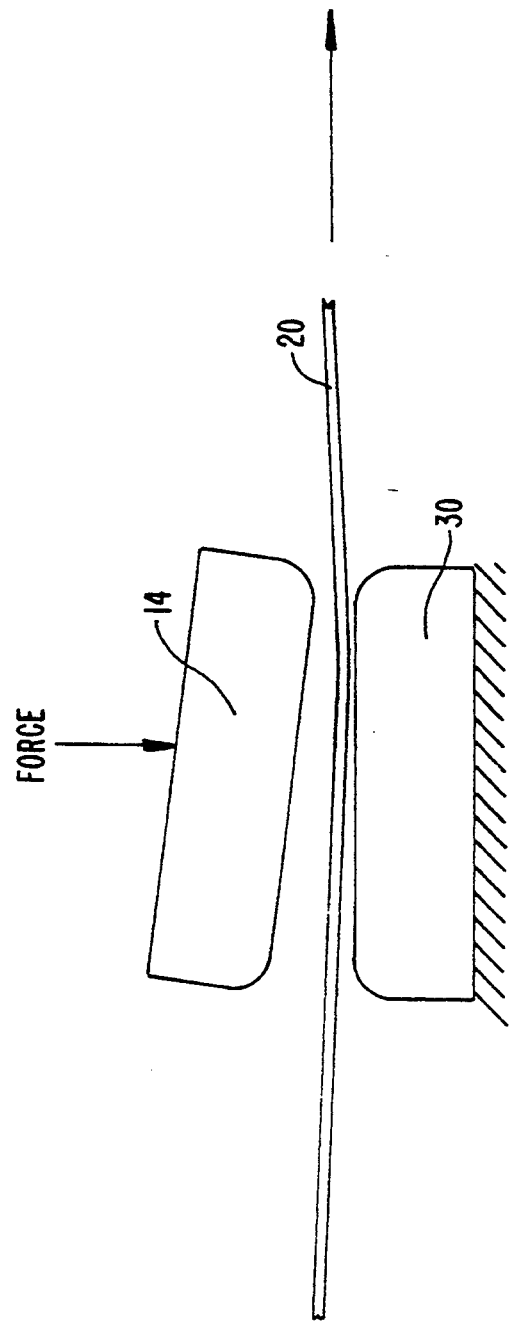
FIG. 7A.
FIG. 7B.

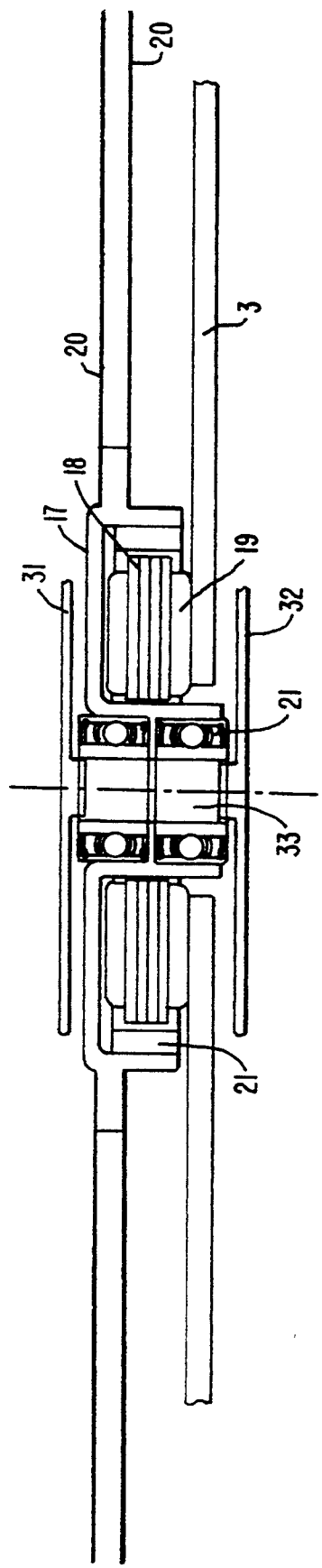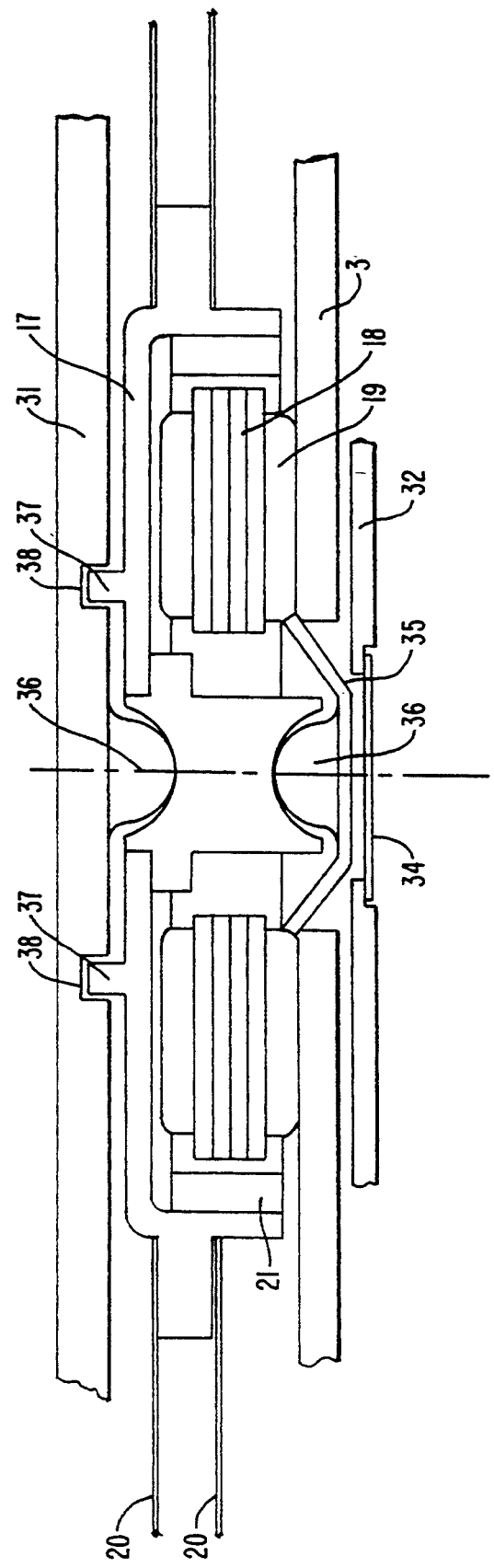

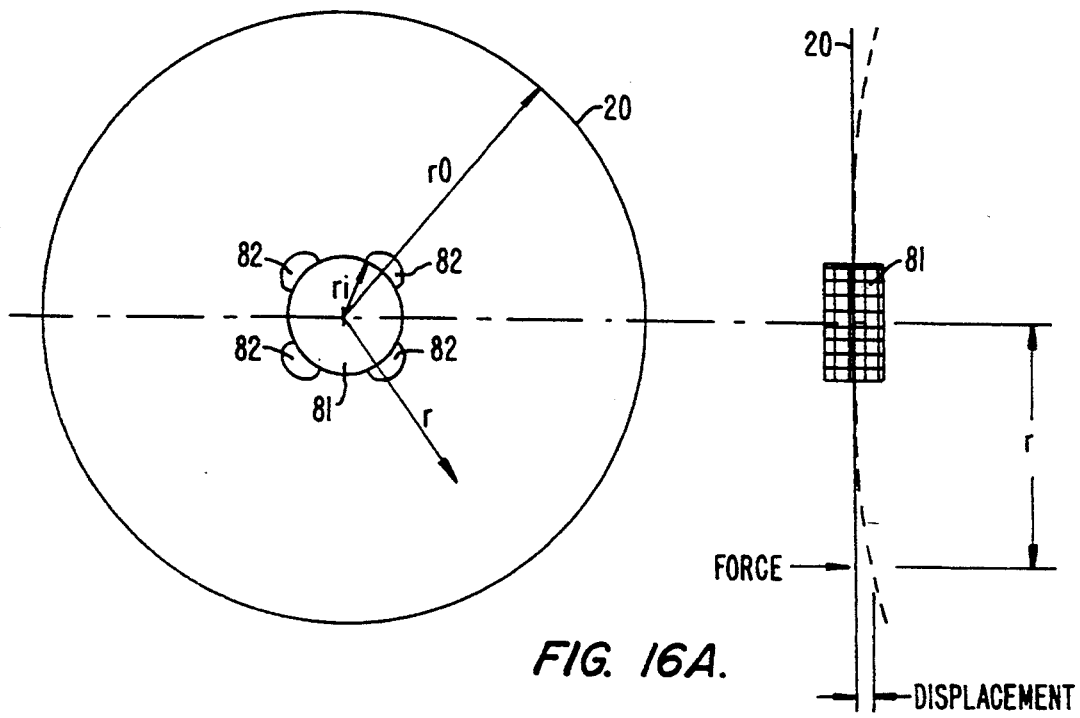
FIG. 16A.
FIG. 16B.
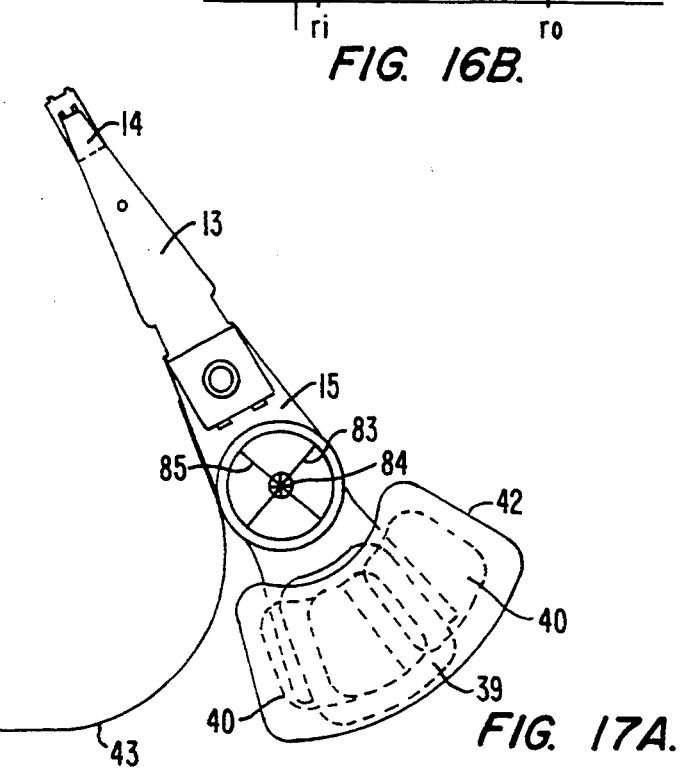
FIG. 17A.

ULTRA SLIM DATA STORAGE MODULE UTILIZING PLURAL FLEXIBLE DISKS

BACKGROUND OF THE INVENTION

The present invention relates generally to devices for storage and retrieval of electronic data, and more specifically to disk drives for the storage and retrieval of information in computer systems, particularly portable computers and other computers for which a highly compact data storage medium is desirable.

The continuing trend toward portable computing systems is creating demands for storage devices that are extremely rugged, portable, economical and have a very thin profile. The predominant storage subsystem used in computers today consists of a removable volume device, called a floppy disk drive, and a fixed storage volume device, called a hard disk drive. The floppy disk drive functions as an economical software loading and distribution system, while the hard disk drive serves as the on-line, high speed, and high reliability data storage unit.

Common floppy disk drive mechanisms utilize a flexible Mylar disk that is coated with a thin layer of magnetic material. Recording/retrieval of data is performed by a ceramic head that houses a magnetic transducer. The Mylar disk is spun at a relatively low speed of approximately 300 rpm, and the ceramic head is penetrated into the plane of the disk, such that intimate contact is maintained between the head and the disk during the recording and retrieval of data. Such a technique is described by Tandon et al. in U.S. Pat. No. 4,151,573, the complete disclosure of which is incorporated herein by reference. This contact recording technology limits the performance of these devices.

Common hard disk drives utilize a rigid disk that is made of aluminum, glass or a ceramic material. The disk is much thicker that the Mylar floppy disk, and it is polished and coated with a thin layer of magnetic material. A small ceramic head, which is also polished and lapped, operates on this disk surface such that, as the hard disk spins at a speed of approximately 3600 rpm, a thin air film develops between the disk surface and the ceramic head. The thickness of this air film is governed by the speed of the disk, the geometry of the ceramic head, and an external force that is provided by the suspension which mounts this ceramic head onto the drive's actuator mechanism.

The major difference between floppy disk technology and hard disk technology is the fact that, the ceramic head in the floppy disk drive is in contact with the Mylar disk, while in the hard disk drive it is separated by a small and controlled air film, and it never contacts the magnetic coating during the recording process. Consequently, hard disk drives attain very high data recording and retrieval speeds, while data reliability is ensured by the non-contact operating conditions of the heads.

The technologies used by magnetic storage products generally fall into one of the following categories: Those that relate to the composition of the magnetic coating deposited on the substrate material, those that relate to the physics of the recording transducer, those that relate to the geometry of the ceramic head for contact or non-contact operation, those that relate to the design of the head/disk assembly that services the operating environment of the recording head, and those that relate to the recording/control electronics.

The current state of the art provides similar magnetic characteristics in the coatings that are available on the Mylar substrates of floppy disks and those that are deposited on the hard aluminum or ceramic disks. The processing methods for these substrates, however, are quite different. Mylar is available in sheet form, and it is coated using a wet process with a slurry consisting of magnetic particles, a binder material and a dry lubricant. After the coating process the disks are cut from the roll material and finished using appropriate burnishing operations. Newer processing techniques are becoming available, whereby, the magnetic material is deposited onto the Mylar film using a vapor deposition technique.

The hard disk process is much more elaborate, and requires the disk to be lapped and polished to a high degree of precision. This necessitates that the disks be larger in thickness than the Mylar disk, and have sufficient rigidity so that the polishing operations can be performed satisfactorily. The magnetic coating is then deposited onto the disk surface in a two stage operation, that first consists of depositing a hard film of nickel, followed by a thin layer of magnetic material that is sputter coated. The disks are finished by overcoating the magnetic film with a layer of carbon, to provide some lubricity and environmental protection for the corrosive magnetic coating. In the Mylar process, corrosion protection is achieved by coating the individual magnetic particles prior to mixing them in the slurry. Finally, due to the different processing methods the cost of a finished Mylar disk is significantly lower that the cost of a hard disk.

Recording transducer technology is quite similar between the two types of storage devices. However, product cost considerations have caused the lower performing, contact-recording floppy disk drive products to use transducer technologies that are typically below the state-of-the-art. Hard disk drives on the other hand, due to their greater market appeal, have successfully employed transducer technologies that are at the state-of-the-art. The most common recording transducer consists of a "soft" magnetic core material that is fabricated in a "C" shape. A highly controlled gap is developed between the two legs of the "C", such that, the magnetic flux fringes at this gap to influence the magnetic state of the particles in the disk coating. A coil of wire is wrapped around one leg of the "C" shaped transducer core, such that the magnitude of the current flowing in the coil governs the intensity of the fringing field in the gap for the recording process. The change of magnetic flux due to the passage of previously recorded information on the disk surface under the gap causes a current to flow in the head coil for the read back process.

Such transducer elements are manufactured by first building the "C" structure as a long bar of ferrite material and then machining each individual transducer from this long bar. Alternatively, a thin-film sputter deposition process is used wherein Permalloy layers form the legs of the transducer core, and copper layers form the coils in an intricate structure. This type of transducer structure is commonly called a thin film head. Thin film heads are more precise, requiring a number of processing steps, and consequently are more expensive. They are used in products that employ very large track densities, typically greater than 1800 tracks per inch, while the machined cores are cheaper and are limited by current machining precision to approximately 1800 tracks per inch.

The assembly methods and the design considerations for the contact-recording floppy disk drive vary significantly from those of hard disk drives. The hard disk drive mechanisms are designed to provide a reliable platform for the heads to maintain their non-contact operating condition with the disk surface. The disk is mounted onto a spindle motor, the axis of which is maintained parallel to the axis of the rotary actuator or perpendicular to the linear actuator, depending upon the specific design configuration. The wobble of the spindle motor, flatness of the disk, the clamping stresses of the disk on the spindle motor, and the runout of the spindle motor are controlled to maintain a flat spinning surface. The actuator mechanism is similarly designed with due consideration such that the ceramic head traverses along a radial trajectory in a plane that is parallel to the disk surface.

The head/disk assembly is manufactured in a very clean environment and contaminant particles are controlled so that they do not interfere with the operation of the non-contact ceramic head. For example, in the current state of the art, ceramic heads operate at a distance of approximately 0.1 micrometer (4 microinches) from the disk surface at the location of the recording transducer gap in the head structure. This means that in the current hard disk air bearing configurations, during operation, the entire trailing edge of the head, which is where the recording transducer is attached, is required to operate at this height above the disk surface. Submicron contaminant particles, if not properly controlled, can get wedged between the hard ceramic head surface and the hard disk substrate resulting in a head crash and loss of data. A filter material may be provided in this assembly for the air to be continually circulated through this filter for removal of contaminants and wear particles during the life of the disk drive product.

The result of all these operational requirements is that there is a limit to the economy with which a hard disk drive product can be manufactured. Furthermore, the entire mechanism must be designed with the necessary precision to cater to the operating boundaries of the non-contact head/disk interface. This precision also limits the ruggedness of the final product. Finally, due to the thickness of the hard disk, and the configuration of the ceramic head assemblies, there is a limit to the number of disks that can be packaged within a given product vertical height.

Floppy disk drives, on the other hand, operate in an open environment and are manufactured under less stringent conditions, resulting in a significantly lower product cost. The flexibility of the Mylar storage medium and the construction of the ceramic heads used in these disk drives give them a greater degree of ruggedness than hard disk products. However, these very operating conditions along with the contact recording methods limit the performance and storage capacity achieved in these devices.

In rotating memory products, information is recorded in concentric rings, called tracks, that span from the outer diameter of the disk to an inner diameter. The control electronics drive a head positioning actuator mechanism, which commonly utilizes a coil of wire placed in a magnetic field, so as to position the recording transducer in the ceramic head directly over a specific track. The recording heads are mounted on a structure that is connected to the coil of the actuator mechanism and supported by bearings in an appropriate fashion so as to have freedom of movement in a radial trajectory over the disk surface. The positioning servo control system derives its information from pre-defined bursts of information recorded along with stored data on all the tracks. This type of control system is called an "embedded servo control system" in the industry. Another servo control system is also employed in products that have more than two disk platters, where all the tracks on a specific disk surface are pre-recorded with a unique and dedicated servo pattern, and the head that operates on this surface is continuously reading this position information. The control electronics in these products sample the pre-recorded servo information from the respective track and corrective action is initiated as position errors are detected by the control loop.

Information is recorded in these drives in small segments that are 512 bytes long; these are called data sectors. The information recorded in each data sector is uniquely identified by a label called a header, and appended by additional bytes that contain a specific error correction algorithm. The heads, once positioned over the desired track, write or read information from some specific data sectors. The signal generated by the heads is amplified and processed by electronics and then assembled in a local buffer memory located in the drives electronics, prior to being passed on to the host computer system. The logic of the servo control system as well as the initiation of a read or a write operation, buffering of the data and then transfer of this data to the host computer is performed by a local microprocessor and electronic circuits mounted on the disk drive printed circuit board (PCB).

Hard disk drives operate at significantly higher speeds than floppy disk drives, and at the current state of the art, track densities of hard disk drives are 10 to 17 times larger than those used in floppy disk drives.

Product cost considerations dictate the electronic integrated circuit (IC) technologies employed by these respective disk drives. The trend towards miniaturization has resulted in greater integration of the electronics, as well as the development of IC chips that have a low vertical height and a small foot print. Furthermore, this trend has also resulted in more controller functions to be incorporated in the disk drive subsystem. These electronic design concepts allow a greater degree of flexibility in terms of data formats and device specific functions, while the external system is relieved of these tasks, and interface standards are maintained at a higher level.

Due to the extensive cleanliness requirements in hard disk drive products, all the electronics are incorporated on a PCB mounted under the head/disk assembly structure, resulting in an undesirably thick package for the entire device. In floppy disk drives, a mechanism is required to handle the insertion and ejection of the floppy diskette. This mechanism occupies considerable space in the head/disk area, thereby, the electronics are packaged under the drive casting, also creating an excessively thick package.

The interface types that are in common use today are the IDE and the SCSI standards. A new interface standard is becoming popular called the PCMCIA standard for credit card-type removable devices. At the present time the PCMCIA standard has two definitions for the vertical height of the removable peripheral device, namely, a version I accommodating devices that are 3.3 mm tall and a version II that covers devices that are 5.0 mm tall. Hard disk drive products currently cannot be designed to fit these form factors. Consequently, expensive semiconductor based units are servicing these needs in the market place.

Attempts have been made in the past to create products that use floppy disks that operate at high speeds, such that the heads can develop a non-contact condition with a single side of these disks. One commercial device is called a Bernoulli disk drive. This device depends upon the air pressure developed between the spinning flexible disk and a stationary backing plate to support the flexible disk, thereby giving it the necessary stiffness and stability to support hard disk-like operating characteristics. The recording head is penetrated into the plane of this disk from the side of the backing plate, as described by Losee and Norton in U.S. Pat. No. 4,414,592, the complete disclosure of which is incorporated herein by reference. This head has a very complex geometry and is quite costly. So far this technique has not been successfully extended to products with disk sizes that are smaller than the standard 5¼ inch product form factor.

Other attempts have been made to stretch a flexible disk over a plastic hub structure similar in construction to a drum. Standard hard disk heads were flown on the exterior flexible disk surfaces of this device. However, it has been found that the separation distance of the non-contact head is directly related to the value of the tension in the disk surface. Variations in tension would result in significantly different recording performance of the product. This dependence on disk tension in these products created problems in realizing this technology in any viable production volume.

A data storage and retrieval device is therefore desired which would have the high-speed, high storage characteristics and reliability of a hard disk, but with the low cost manufacturability and ruggedness of floppy disk drives. In addition it would be desirable if the device were extremely compact so as to meet the specifications of the PCMCIA standard. Preferably, the device should be adaptable to current computer systems without requiring specially-designed electronic modifications or additions to the existing computer hardware. Most desirably, the device should be removable to permit multiple storage units to be interchanged.

SUMMARY OF THE INVENTION

The present invention provides an extremely compact data storage and retrieval device which has the high capacity, reliability and speed of a hard disk drive while having the economy and ruggedness of a floppy disk drive. In a preferred embodiment, the device utilizes a flexible disk as in a floppy disk drive, but a non-contacting head as in a hard disk drive. Control electronics are housed within the device much as a hard disk drive so that the device may be connected to a computer in the same manner as a hard disk drive, without specialized external control hardware. At the same time, the device of the present invention may be removable, permitting multiple storage units to be interchanged like a floppy disk drive. Further, the device may be configured to allow Smart Card-like storage units to be developed with capacities that can be larger than 100 MB. The device may also be configured for assembly onto a computer mother board similar to electronic IC's.

In a preferred embodiment, the data storage device comprises a housing defining a sealed enclosure, a motor mounted within the housing having a rotatable spindle, a flexible disk non-removably mounted to the spindle to rotate therewith, and a read-write head disposed within the housing over a first surface of the disk for reading or writing data thereon. By the use of a flexible disk of a material such as Mylar, the housing has an extremely small height, preferably less than 5.0 mm, and the device is economical and rugged. At the same time, high storage capacity and speed is attained by the use of a read/write head which reads or records data without contacting the disk surface during operation. In preferred embodiments, multiple disks and/or multiple heads may be employed for extremely large data storage capacities in ultra-compact devices.

A further understanding of the nature and advantages of the invention may be realized by reference to the remaining portions of the specification and the drawings.

BRIEF DESCRIPTION OF THE DRAWINGS

FIGS. 1A and 1B are top and side elevational views of a data storage device constructed in accordance with the principles of the present invention.

FIGS. 2A and 2B are top and side cut-away views of the interior of the data storage device of FIG. 1.

FIGS. 7A and 7B are side elevational views of the heads and disk of the data storage device of FIG. 1 using a single disk.

FIG. 8 is a side cross-sectional view of a spindle motor employing sealed ball bearings in the data storage device of FIG. 1.

FIG. 9 is a side cross-sectional view of a spindle motor using jewel bearings in the data storage device of FIG. 1.

FIG. 16A is a top elevational view of a disk in the data storage device of FIG. 1 illustrating displacement force as a function of radius.

FIG. 16B is a graph of stiffness as a function of radius for the disk of FIG. 16A FIG. 17A is a top elevational view of a frictionless pivot for positioning the head in the data storage device of FIG. 1.

DETAILED DESCRIPTION OF THE PREFERRED EMBODIMENTS

FIGS. 1A and 1B illustrate a preferred embodiment of the data storage device of the present invention. The device has an enclosure 1 that contains the recording components and all the electronics. An external system can exchange data with this device through the connector 2. The product is configured using standard electronic and recording components that are available in large manufacturing volumes today. It stands 5.0 mm tall and the foot print of this specific embodiment is made to conform to what is defined as a PCMCIA version II standard for a removable or as an ultra slim fixed volume storage unit. The package height of the disk drive, along with its weight, lower manufacturing cost, and ruggedness qualities have hitherto not been possible with design techniques in use at this time.

Figure 2A:
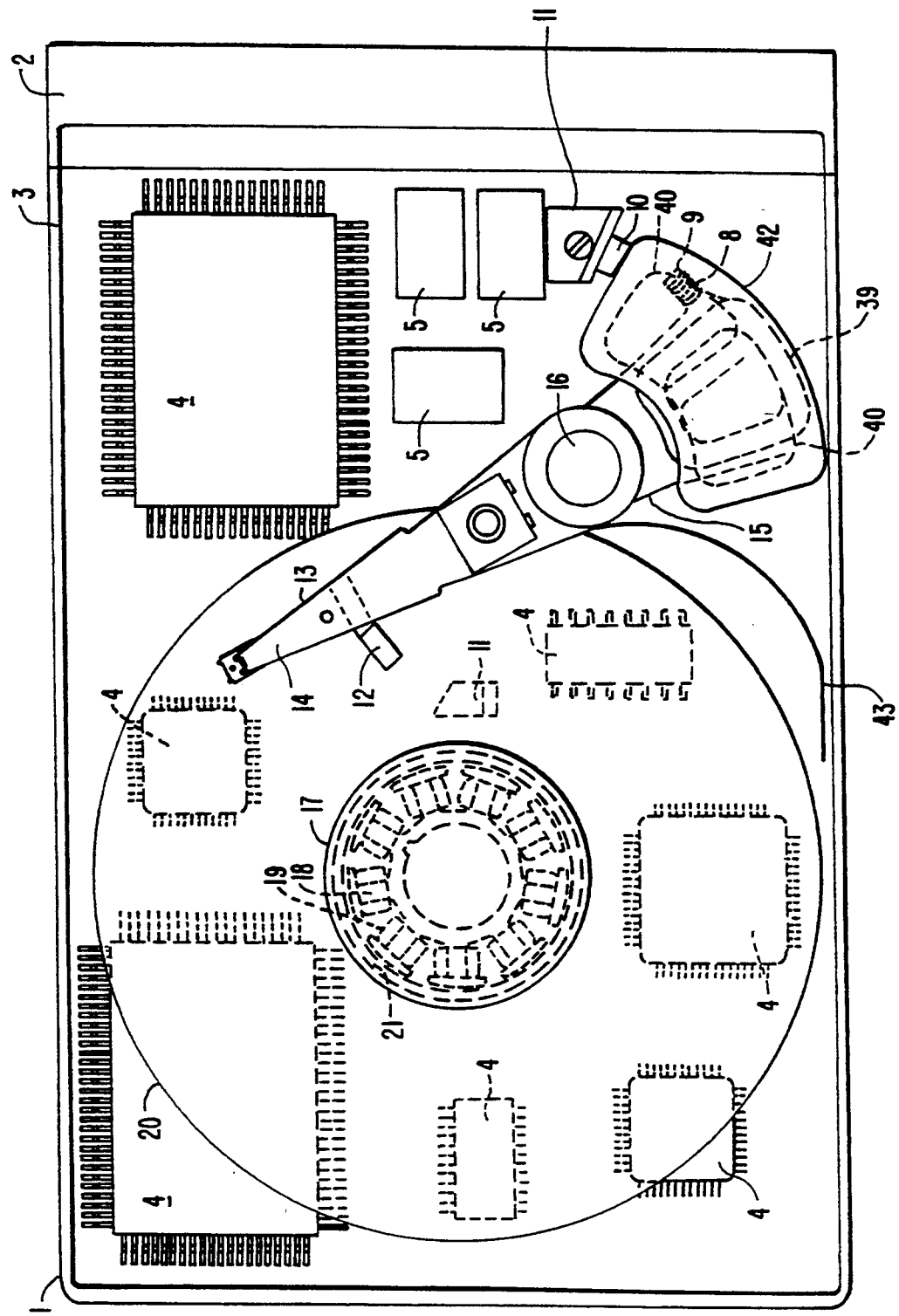

FIGS. 2A and 2B illustrate the arrangement of the various components in another preferred embodiment of the invention. This drive contains two flexible disks 20, which may be, for example, Mylar, mounted on a spindle rotor 17. The stator, 18, of this motor is mounted onto the printed circuit board, 3, which contains electrical circuits, 4, to drive the disks, 20, at a prescribed rotational speed. The rotary actuator, 15, is also assembled on this printed circuit card, achieving a compact and rugged storage unit. The printed circuit board, 3, is contained in the same housing as the heads and the disks. A flexible cable, 43, connects the Read/Write coils of the recording heads, 14, and the actuator coil, 39, to the respective electronic devices. 4, on the printed circuit card, 3. The electronic devices, 4, stand approximately 1.4 mm tall and have a very small foot print. Certain discrete electronic devices, 5, that are not available in heights of 1.4 mm or less are mounted on the PCB, 3, in areas that are not occupied by the disks, 20. The printed circuit card, 3, is 0.8 mm thick and has multiple layers that are bonded together. This type of circuit card is readily manufacturable with current PCB fabrication technology. The storage device communicates with a computer system through the connector, 2. The device depicted in FIGS. 2A and 2B preferably operates at approximately 3600 rpm and to a user it performs exactly as though it were a hard disk drive.

It should be recognized that the disk drives depicted in FIGS. 1 and 2 are only two possible embodiments of the storage device of the present invention. Other unique product configurations and storage applications can also be designed. Furthermore, as commercial components become smaller, such as smaller IC packages, thinner printed circuit boards, thinner recording heads etc, even smaller and more compact products can be developed using the principles of the present invention.

Figure 3A:
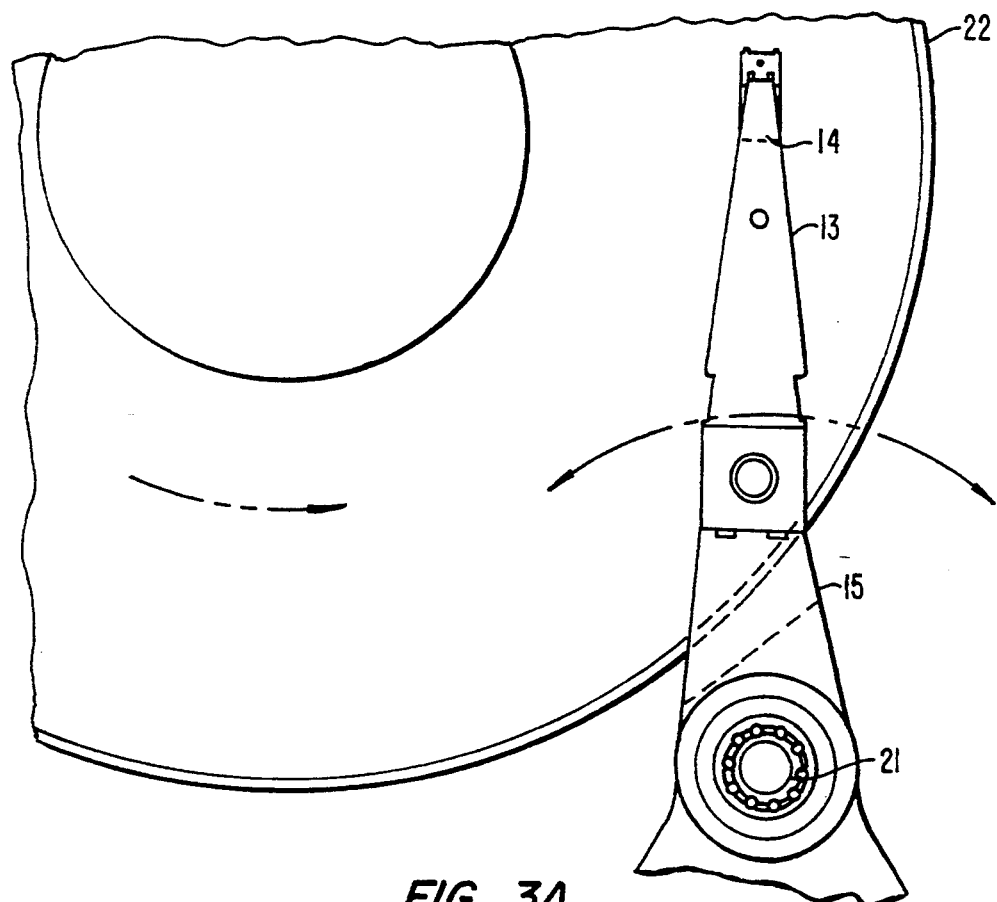
FIGS. 3A–3C are top and side elevational views of a typical hard disk drive illustrating the head/disk interface arrangement.
Figure 3B:
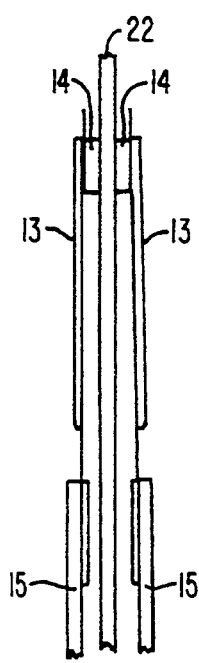
Figure 3C:
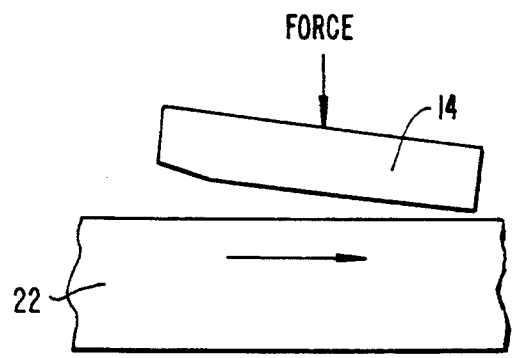

The disk drives shown in FIGS. 1 and 2 operate at speeds similar to a hard disk drive, but use cheaper, flexible disks of material such as Mylar in place of rigid aluminum, glass or ceramic disk substrates. A typical hard disk recording apparatus is illustrated in FIGS. 3A-3C. The recording heads, 14, operate by flying on a thin film of air established over the rigid disk surface, 22. An equilibrium condition is attained between the applied load of the suspension, 13, and the air bearing forces developed in the air film between the stationary head, 14, and the rapidly moving disk surface, 22. The disk, 22, is rigid so it does not move away while these forces are operational, whereby very small head to disk separation distances can be attained.

Figures 4A, 4B:
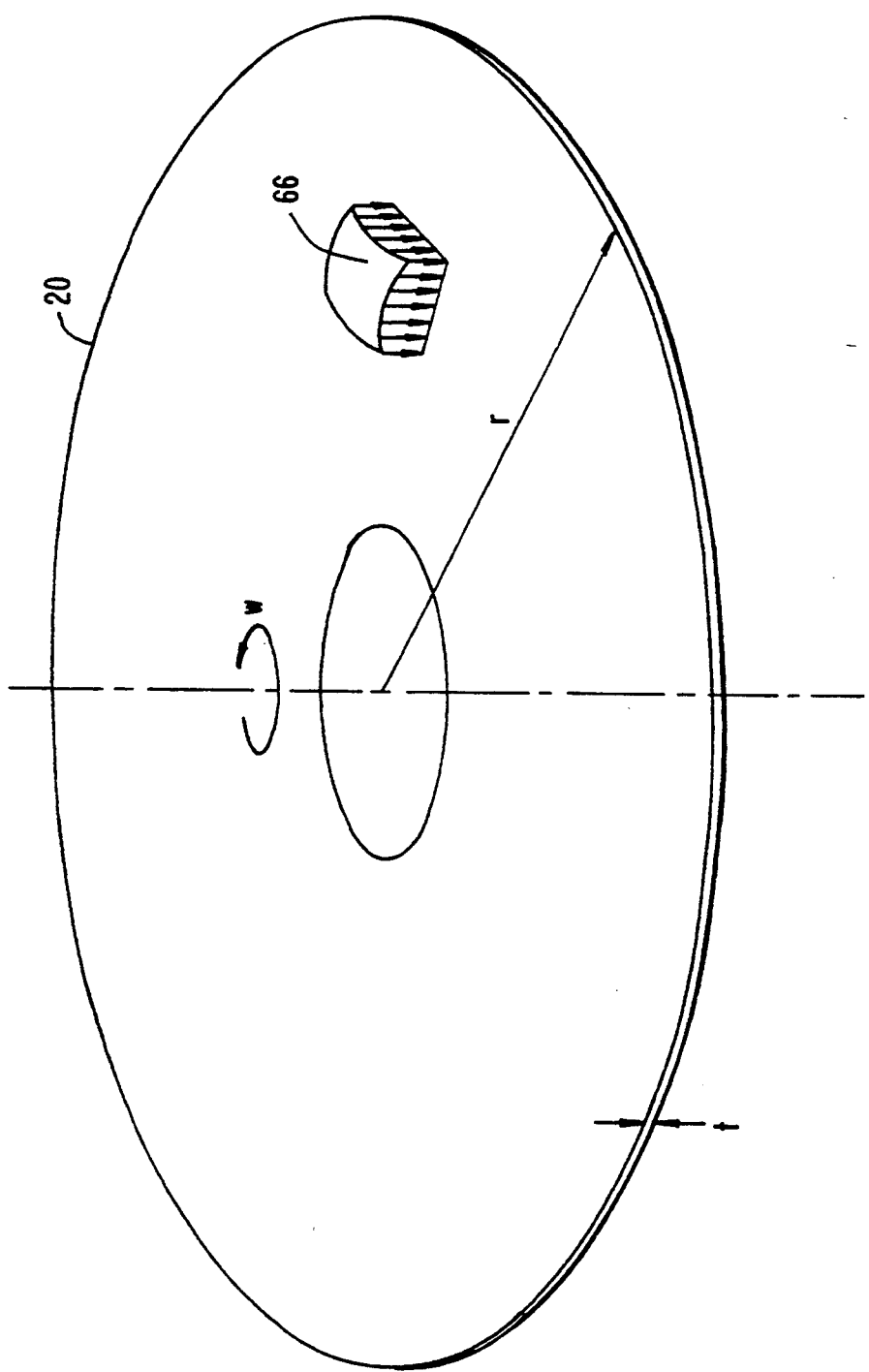
FIG. 4A is a perspective view of a flexible disk illustrating the loading conditions on the disk as it operates at a high speed.
FIG. 4B is an equation describing a non-dimensional stiffness parameter using the material, geometric characteristics and rotational speed for the disk of FIG. 4A.

In the past, Mylar disks have been tested under high speed operating conditions, particularly when disk diameters conformed to 8" and 5¼" size disk drive products. These experiments have shown that Mylar disks do not have adequate bending rigidity particularly around the outer portions of the disk, and, therefore, these portions would go into unstable oscillatory behavior whereby a reliable flat surface was not available to support any type of non-contact operation of the recording heads. A technical paper entitled "Deflection of a Very Flexible Spinning Disk Due to a Stationary Transverse Load" Transactions of the ASME, September 1978, Volume 45, page 636, the full disclosure of which is incorporated herein by reference, studied this phenomenon, and reported a non-dimensional stiffness parameter that was directly related to the product of Young's Modulus and thickness of the flexible disk to the second power, inversely proportional to the product of mass density of the medium and the rotational speed to the second power and the fourth power of the disk radius. This is illustrated in FIGS. 4A and 4B, where the flexible disk, 20, has a radius "r" a thickness "t" and is rotating at a speed "w" with "E" and "$\rho$" being the Young's Modulus and mass density of the medium and "$v$" being the Poisson's ratio. As the flexible disk diameter becomes smaller the fourth power of the radius causes the stiffness of the disk to increase such that oscillatory behavior is no longer observed.

However, a stationary surface, 66, will develop a force on the flexible disk similar to the hard disk shown in FIG. 3. This force is created by the development of a velocity gradient between the air adjacent to the spinning disk operating at about the linear velocity of this surface, while the air adjacent to the stationary surface is close to zero velocity. This force, as in the hard disk apparatus, can be balanced by a force developed by the suspension, 13, however, the disk, 20, is flexible and cannot maintain its position. Consequently, a recording apparatus using a single recording head on a small flexible disk would attain unacceptably large separation distances between the head recording transducer and the disk. Two spring loaded heads configured similar to a hard disk drive arrangement would result in an interface that is not controllable in the vertical dimension due to the non-rigid nature of the heads and the disk. Servo control would be impossible and rapid accessing would result in failure of either the disk or the heads.

The data storage device of the present invention provides a two-sided recording head arrangement such that one or more flexible disks may be substituted for the hard disks without affecting the typical hard disk drive arrangement. These disks may be constructed from Mylar, paper, or a metal or non-metallic foil substrate. The flexible disks will preferably have nondimensional stiffness value greater then 0.005.

Figure 5A:
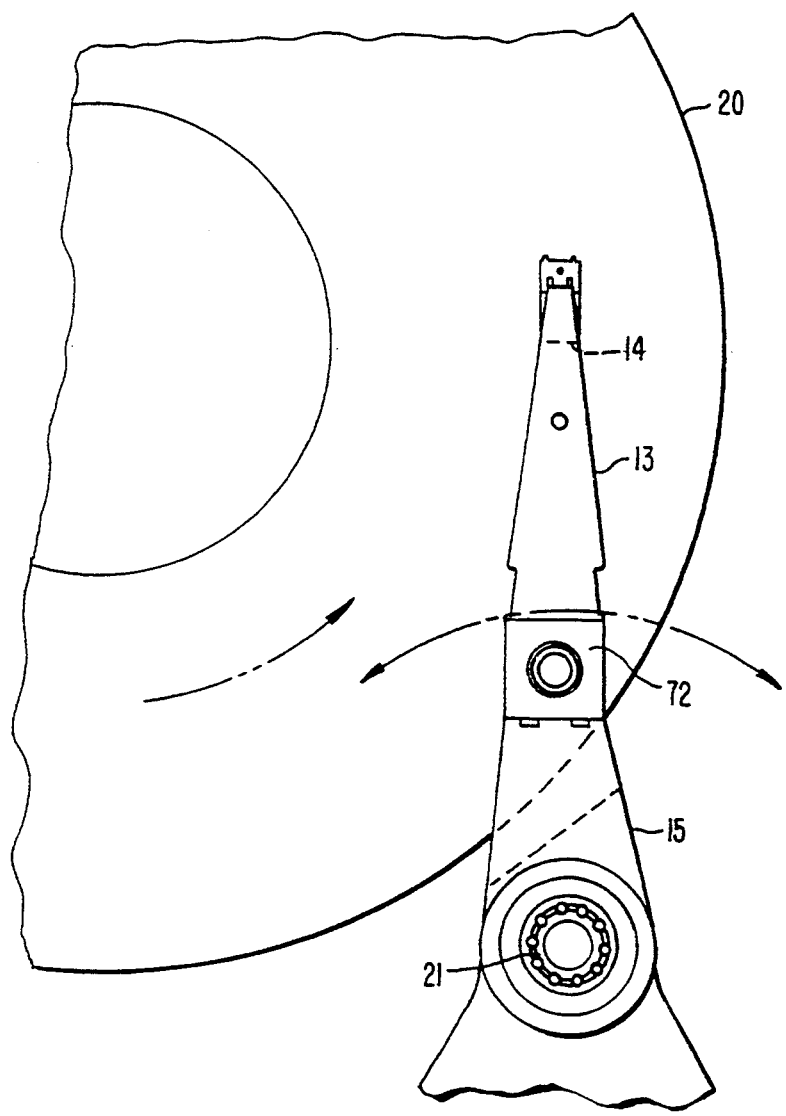
FIGS. 5A–5C are top and side elevational views of the head and disk of the data storage device of FIG. 1.
Figure 5B:
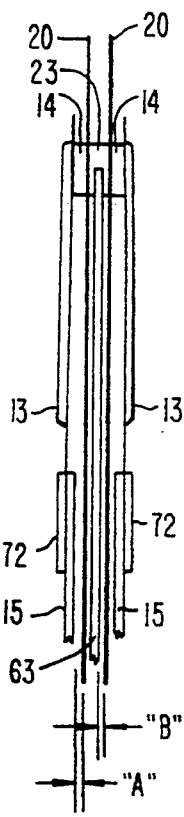
Figure 5C:
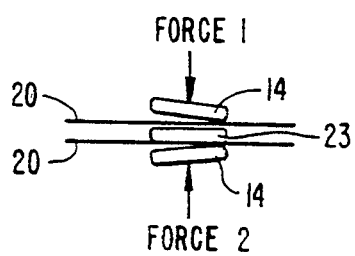

A preferred arrangement for a flexible disk recording apparatus is shown in FIGS. 5A–5C. Two flexible disks, 20, are disposed between two hard disk heads, 14, that are mounted using hard disk type suspensions, 13. A central head, 23, is arranged opposing these two heads located in the middle of the disks, 20, and attached to a rigid arm, 63. Preferably, the central head 23 is rigidly mounted, so as to have a roll and pitch stiffness of at least two times that of the suspended heads 14.

As the disks spin at high speed an air bearing film develops between the disk surface and the recording heads similar to that illustrated in FIG. 3 for the hard disk arrangement. However, in the embodiment of FIG. 5, the central head, 23, establishes a rigid reference plane about which both the disks, 20, and the heads, 14, can attain an equilibrium condition. The disks are flexible and, consequently, no accurate alignment of the spindle motor axis to the rotor axis is necessary. The thickness and angular orientation of the central head, 23 can also have greater freedom. For example, if the two heads, 14, were not assembled, the disk would fly away from the surfaces of the central head, 23 until a point was reached where an equilibrium condition was attained between the air bearing forces created by the surfaces of the head, 23, and the bending stiffness of the disk, 20. The disk in this arrangement would have a considerably larger spacing than what is required for reliable data recording. The two spring loaded heads, 14, develop air bearing forces (Force 1 and Force 2 of FIG. 5C) in a manner to urge the disks, 20, towards the central head, 23, such that a preferred disk orientation is attained. The components in this embodiment of the data storage device are designed to maintain some clearances, labeled "A" and "B" in FIG. 5B, to protect the disks, 20, from contacting the actuator arms, 15.

Figure 6A:
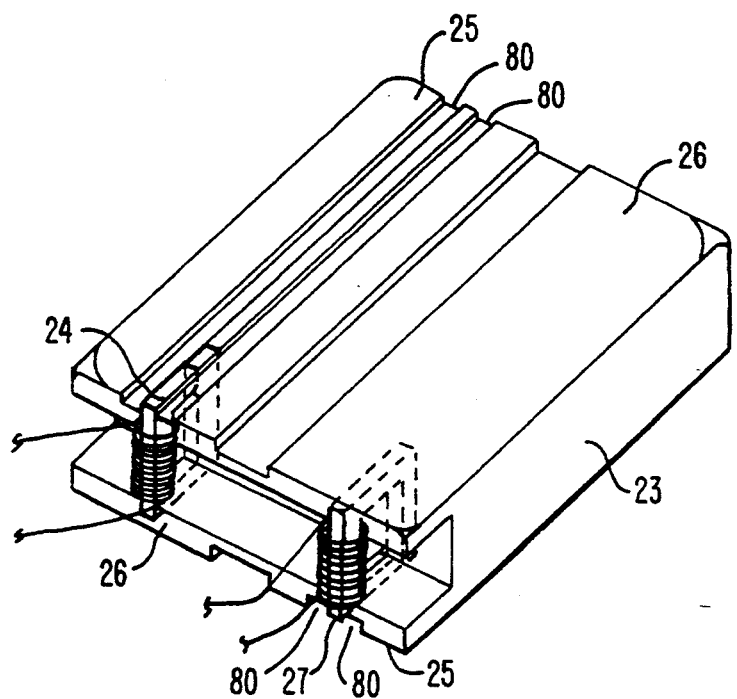
FIG. 6A is a perspective view of the central head of the data storage device of FIG. 1 using a pair of disks.
Figure 6B:
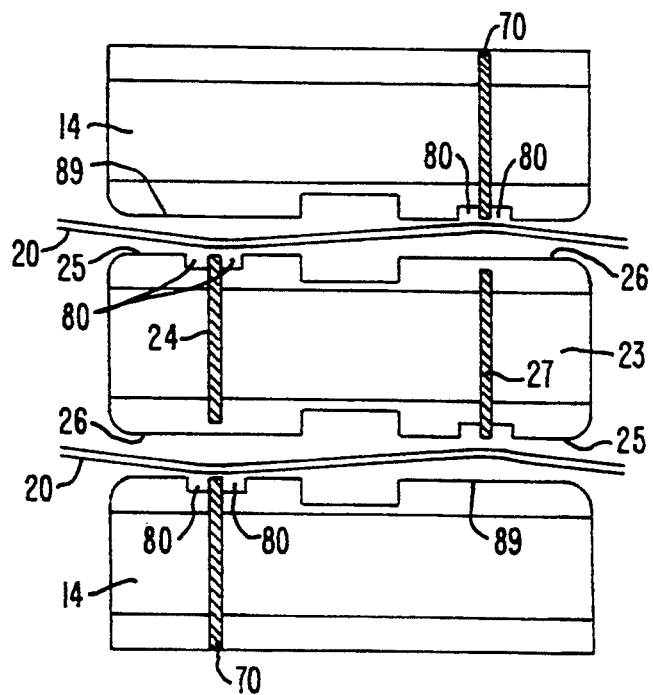
FIG. 6B is a side elevational view of the central head of FIG. 6A operating in conjunction with a pair of opposing heads on a pair of flexible disks in the storage device of FIG. 1.

FIGS. 6A and 6B depict a preferred embodiment of the central head, 23. Two recording transducers, 24 and 27, are mounted in this head. The transducers are separated from each other to minimize cross-talk between them. Each transducer addresses a specific disk surface. The central head 23 is made up of two rails, 25 and 26, on both its top and bottom surfaces. These rails have smooth and rounded edges. Furthermore, the geometry of these two rails can be different to achieve beneficial orientations of the flexible disks, 20, in the vicinity of the recording transducers, 24 and 27. In a preferred embodiment one of these rails 25 has two longitudinal slots, 80. The opposing head, 14, has an opposite configuration as illustrated in FIG. 6B. The loaded heads, 14, have recording transducers 70 in rails that face the non-transducer mounted rail, 26, of the central head, 23. This minimizes magnetic interference between the transducers due to negligible thickness of the disk. Additionally, the height of these transducer elements, 24 and 27, is arranged to maintain some vertical distance such as that between transducers 70 and 24, in the figure. In this embodiment of the storage device, only one head is active at a specific time, resulting in some electrical isolation, whereby the thickness for the central head, 23, can be minimized.

It can be seen in FIG. 6B that the slots in the head rails 25 bleed air pressure compared with the opposing rail 89, whereby, a resultant air bearing force urges the disk towards the recording elements 24 and 27. Other points in this head/disk interface operate at considerably larger distances. The flexibility of the disk, 20, is utilized to attain such a preferential orientation. As a result, the small separation distance at each of the recording transducers is backed by a much larger distance from the opposing head surface, such that the disk has space to move away in the event small particles enter the interface. Contaminant particles can pass through the interface or in the slots, 80, without damaging either the disk or the recording heads. The data storage device can therefore operate at high speeds in much harsher environments, and with an extremely small separation distance between the recording transducer and the magnetic coating on the disk.

Another advantage of this recording interface is that four recording surfaces become available in about the same space, and at about the same or lower cost than a single hard disk apparatus. To understand this further, consider the vertical space of the head disk arrangement shown in FIG. 3B. The typical thickness of a rotor arm, 15, is 0.635 mm, the distance between the head mount surface on the rotor arm, 15, and the head, 14, air bearing surface is typically 0.965 mm. Newer head assemblies that use very thin ceramic heads have reduced this dimension to 0.584 mm. These heads, due to tight dimensional tolerances, cost considerably more than those that employ the thicker ceramic slider body. The thickness of the disk 22 is about 0.635 mm, resulting in a total height of this recording apparatus of 3.07 mm to 3.84 mm. The components of the storage device of the present invention, as shown in FIG. 5B, consist of the suspension mounts, 72, of 0.3 mm thickness, distance between the suspension mount surface, 13, and the air bearing surface of the head, 14, of about 0.965 mm, a disk thickness of around 0.0762 mm, a central head width of typically 1.0 mm, resulting in a total vertical height of this recording apparatus of 3.68 mm.

The cost of the single hard disk offsets the cost of two Mylar disks and the central head 23. To analyze this aspect in more detail, today's leading edge recording components consist of thin film heads that operate at about 2750 tracks/inch and high coercivity thin film deposited hard disks that attain a linear recording density of typically 50,000 bits/inch. This results in an areal recording density of 137.5 million bits per square inch with an approximate material cost of $33.00 per disk platter. The high track density requires the use of thin film-type recording heads, adding substantial cost to the device. A similar analysis for a preferred embodiment of the storage device of the present invention results in an areal density value of 153.0 million bits per square inch at an approximate cost of $22.50, using the values of 1,800 tracks/inch and 42,500 bits/inch. The lower track and linear bit density allows the heads to be cheaper MIG ceramic heads, which cost approximately ⅔ the cost of thin film heads. The central head, 23, has no suspension but requires an additional R/W transducer. Consequently, the central head is equivalent in cost to a suspension mounted MIG hard disk head assembly. The multiplicative factor of two comes from the fact that four recording surfaces are available in the preferred embodiment, instead of two in the hard disk apparatus. Advanced Mylar coated films are becoming available that increase the linear bit recording densities to 70,000 bits/inch and metal vapor deposited films that have the potential of developing more than 100,000 bits/inch. As a result, areal recording densities of over 400 million bits/square inch can be attained —much larger than what is currently forecast for conventional hard disk drive technology.

Referring again to FIGS. 5A–5C, the central rotor arm, 63, is made from aluminum, plastic or a steel stamping with appropriately designed stiffeners to attain the necessary flexural rigidity and to fit within the thickness dimension of a hard disk platter. As disk diameters shrink in size the thickness of the disk, 22, can be made smaller, similarly as flexible disk diameters become smaller, the rotor length becomes smaller, and the central arm, 63, can be made thinner.

Referring to FIG. 6, the read/write transducer cores, 24 and 27, are glass bonded to the ceramic body of the slider in a manner that is standard manufacturing practice. The opposing surfaces of the ceramic slider are polished and lapped, similar to heads used in a hard disk drive product. One aspect of the head configuration shown in FIG. 5 is that the spring loaded recording heads, 14, operate on either side of the central head, attaining an equilibrium loading condition for the rotor arm, 63. Additionally, since four recording surfaces are available in about the same space and cost as a rigid disk arrangement, the track density of the flexible disk interface can be made much smaller for equivalent formatted storage capacity. This allows the anisotropicity of Mylar to be corrected by an hard disk equivalent servo control system design. Finally, Mylar disks are fabricated in less stringent environments and thus products that use such a recording apparatus would be more tolerant to media defects.

Another embodiment of the storage device is shown in FIGS. 7A and 7B, where only a single flexible disk is employed and the non-spring-loaded head, 30, is supported by a rigid arm structure, 63 preferably with a mounting arrangement that gives this head a pitch and roll stiffness at least two times that of the spring loaded head, 14. Again in this interface the mechanical alignment of the spindle and rotary actuator can be fairly loose compared with a hard disk, for lower manufacturing cost. Additionally, there is considerable freedom in the vertical location of the rigid head, 30. In a preferred embodiment this head is arranged with significant negative penetration such that the loaded head, 14, causes the disk to be urged toward the rigid head 30. In this manner, the bending rigidity of the disk over the small area of the head is utilized along with the flexibility of the disk over larger dimensions to develop a preferred orientation of the disk relative to the head, 30. This particular apparatus can be realized in a much smaller vertical space and at a very low cost.

The embodiments depicted in FIGS. 6 and 7 can be compared with the hard disk head configuration illustrated in FIG. 3. The hard disk is typically supported at an inner radius on a spindle motor flange surface, and the heads are loaded into the disk plane at different radial locations as these heads get positioned at the various data tracks. Some hard disk products utilize only a single head per disk platter to achieve smaller vertical height and lower material cost. Consequently, the disks in these designs have to have considerable thickness to sustain the air bearing loads described earlier, while at the same time maintain a relatively flat surface for the heads to fly on a very thin film of air. It should be recognized that in a hard disk apparatus the disk is a reference surface and any variations of this surface such as axial runout, flatness or roughness directly influences the recording performance of the device. In the head/disk interface of this invention the recording reference surface is the rigidly mounted head 23 and 30. Accordingly, the location and position of the spindle motor and disk is not so important. The recording reference surface is now on the positioning actuator itself.

In the storage device of the present invention, the flexibility of the disk, 20, preferably decreases from the outer radius to the inner mounting radius. In a preferred embodiment, the flexible disks, 20, have cutouts, 82, at the inner radius such as those shown in FIG. 16A. These cutouts, 82, reduce the stiffness of these disks at the inner diameters, as graphically illustrated in FIG. 16B, and thereby provide the necessary compliance for the air bearing interface to operate reliably, with fairly loose positioning of the recording head relative to the disk mounting plane.

Referring now to FIGS. 8 and 9, the spindle motor in a preferred embodiment is configured such that the stator, 18, including the coils, 19, is mounted directly on to the printed circuit board 3 of the storage device. The motor preferably comprises a sensorless DC motor to attain a lower cost and a thinner package. The rotor, 17, consists of a carbon steel cup, with a permanent magnet ring, 21, appropriately magnetized, mounted at its inner diameter. The flexible disks, 20, are bonded to a flange that is attached to the rotor, 17, or formed in the structure of this rotor. Perfect perpendicularity or parallelism is not necessary since these disks are flexible. The bonding agent could consist of a piece of double-sided, sticky Mylar tape. The flexible disks have insignificant mass compared to a hard disk and also the air bearing configuration of the head/disk interface has a very small portion of the ceramic slider body that is close to the disk while a majority of the surface of the slider operates at considerably larger distances. The average flying height in this interface is larger than that in a hard disk drive product. Air bearing friction, which is inversely related to the average flying height of the heads, will be significantly lower. Thus, the total payload for this spindle motor is much smaller and the rotor size, 17, permanent magnet size 21, as well as the number of turns in the coils, 19, can be made significantly smaller than a typical hard disk product. The air gap of the motor can also be larger providing greater mechanical tolerances for alignment of the rotor to the stator. Another advantage of this configuration is that a driving voltage of less than 5 volts can be utilized.

FIG. 8 illustrates a sealed ball bearing arrangement to mount the rotor, 17, relative to the stator, 18, such that an appropriate electrical vector can be developed, using the electronics, to cause the permanent magnets in the rotor to follow this electrical vector, generating torque to spin the disks at a specified rotational speed. The ball bearings could be the slim NMB type DDL-520 or equivalent. This is a typical hard disk spindle motor configuration modified to fit on a printed circuit board, 3. The central shaft, 33, would be glued with an appropriately applied preload and mounted at one end in the top cover, 31, and at the other end in the bottom cover, 32. Standard ball bearings that are available today allow such a configuration to be built within a 5.0 mm vertical height. The size of the balls in these bearing are about 1/32nd of an inch in diameter. These balls operate in the inner and outer raceways of the ball bearing. There is a lubricating oil that is provided in this bearing structure to minimize friction in the assembly. However, the small diameter of the balls result in significant Hertzian stresses to develop when the disk drive is subjected to shock loads. These stresses can destroy the smooth surface of the bearing raceways and thereby, result in a failure of the spindle motor.

Another embodiment of the spindle motor is shown in FIG. 9. In this arrangement the rotor, 17, is attached to the spindle shaft and two jewel bearings, one mounted to the top cover, 31, of the drive housing and the other attached to a flexural spring, 35 connected to the printed circuit card, 3, in a preferred configuration or to the bottom cover, 32 in another arrangement. The spindle shaft, 33, is made from hardened 440 stainless steel or chromium steel, as desired, and is contoured at the two ends to accommodate the jewel bearings, 36. A lubricant, which could be similar to the one used in the ball bearings, or a dry film lubricant is provided in this assembly. This spindle motor has a very low profile, along with the fact, the jewels can have large diameters thereby, providing greater shock resistance in the product. The axis of the rotor is established by the point at which the jewels, 36, interface with the spindle shaft, 33. Initial starting torque values of such an arrangement can be large due to the friction between the jewel, 36 and the spindle shaft, but the lower mass of the disks, 20, and the small rotor inertia would compensate for this increased start-up power requirement for the motor.

A circular lip, 37, is developed in the rotor, 17, which operates in a groove, 38, in the top cover, 31. This configuration forms a labyrinth seal to keep the lubricants or wear particles from entering the head/disk environment during the life of the product. In other preferred embodiments, the jewels, 36, are replaced by plastic buttons that contain TEFLON as the lubricant or sleeve bearings impregnated with a lubricating oil. An advantage of this arrangement is that the cost of these bearings is approximately 1/10th the cost of ball bearings.

It is conceivable that the alignments attained in this assembly would not be as accurate as buying a commercial spindle motor that has been tested for torque ripple and radial/axial runout. However, the flexibility of the disks reduces the requirements for very accurate axial runout, while the reduced mass and lower operating friction of the head/disk interface results in a much lower torque requirement. Additionally, if Mylar disks are utilized in the assembly, the anisotropicity of these disks would result in off-track errors that have components at 2, 3 and 4 times the rotational speed. The servo system would need to be designed to reduce these errors, with the result, the gain at the disk rotational speed will be large and will compensate for the radial runout values. Finally, the use of two friction bearings would result in insignificant non-repeatable runout in this assembly compared to a ball bearing that uses a number of balls, each of which can have variations in diameter along with imperfections in the bearing raceways.

Figure 10A:
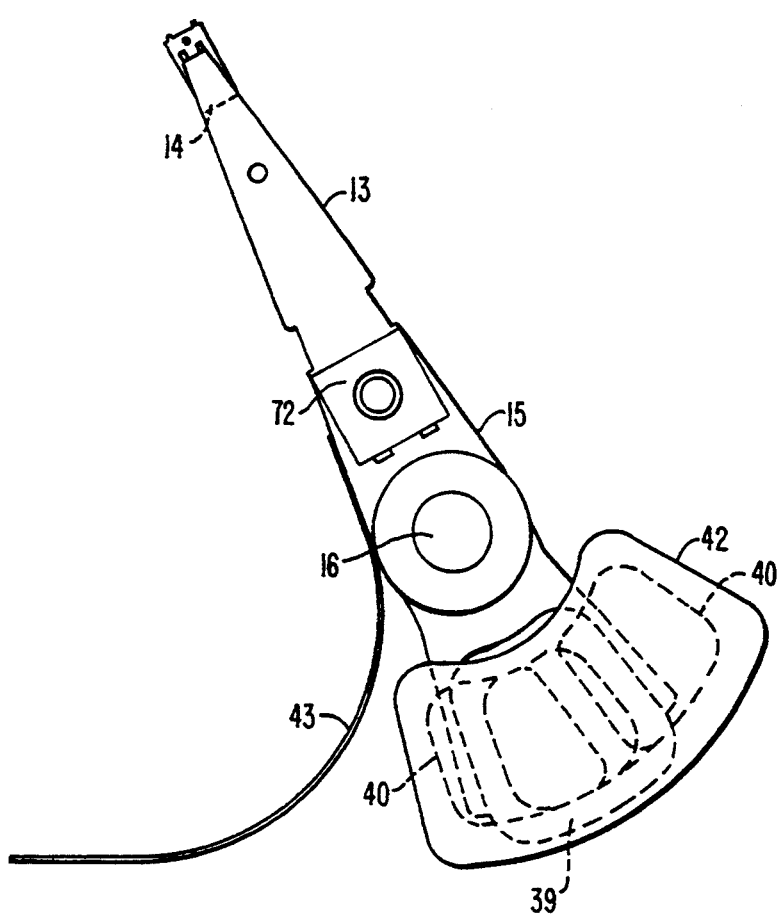
FIGS. 10A and 10B are top and side elevational views of a rotary actuator for use with the head of the data storage device of FIG. 1.
Figure 10B:
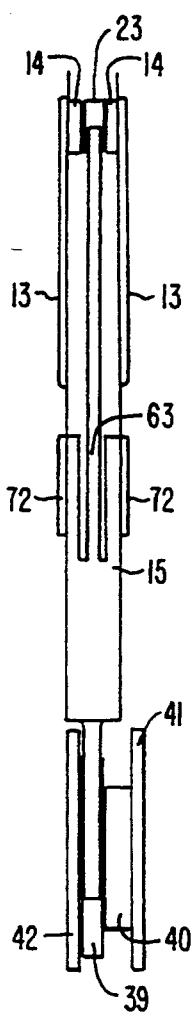

The embodiments of FIGS. 1 and 2 use a rotary actuator mechanism. FIGS. 10A and 10B illustrate a preferred embodiment of this rotary actuator design. A coil, 39, is positioned in a magnetic field developed by two magnets, 40, mounted against an ANSI 1010 or equivalent material plate, 41. Another plate, 42, is mounted over but displaced vertically from the plate, 41. A magnetic circuit is developed between the two magnets, 40, and the steel plates, 41 and 42, such that a flux density is maintained in the air gap where the coil, 39, is located. The intensity of the magnetic field in this gap is directly related to the thickness of the air gap and the thickness of the magnet developing this flux. A parameter called "Kt" is used in the industry to represent these motor characteristics. Current flowing in this coil, 39, interacts with this magnetic field creating a force that is used to control the velocity and angular position of the actuator mechanism. The recording heads, 14 and 23, are mounted at the end opposite to the coil, 39. The rigid arm, 63, can be configured so as to balance the mass of the coil, with the heads and suspensions so as to maintain the center of mass of this assembly about the pivot axis for optimum dynamic characteristics. The arms of the rotary actuator, 15, are supported by a bearing arrangement, 16. This arrangement can be similar to the one described for the spindle motor assembly. As mentioned earlier, if Mylar disks are utilized in the product, anisotropic properties of the substrate along with stress relaxation of the base material would result in off-track errors that can have fairly large magnitudes. Thus, the actuator shaft will be continually moving to overcome these off-track errors, with the result that stiction effects will be extremely small in this arrangement.

The magnet structure described above is formed with ceramic magnets, however, due to the fact that the rotor arms are small, and thus have lower inertia, these magnets can be made quite thin. It is then possible to use deposited magnetic films in place of the ceramic magnets, 40, to attain a lower product cost. Additionally, these deposited films can be made such that the film thickness varies over the stroke of the actuator. The advantage of this would be to develop a controlled characteristic for the motor force constant, Kt. This variable force constant may be designed such that it will compensate for the different magnitudes of the anisotropic off-track errors in the Mylar disk from the outer radius to the inner radius. The control electronics generate a constant excitation, while appropriate amplification or attenuation of this signal will be performed by the motor constant.

Figure 17B:
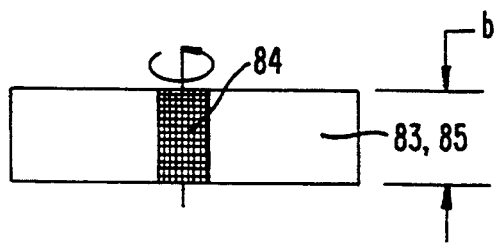
FIGS. 17B and 17C are top and side elevational views of the flexural members of the pivot of FIG. 17A.
Figure 17C:

In another preferred embodiment of the rotary actuator, shown in FIGS. 17A–17E, a frictionless pivot is utilized in place of jewel bearings. A typical disk drive rotary actuator has a flexible cable, 43, that connects the head transducer coils to the appropriate electronics on the printed circuit card, 3. This cable exerts a force on the arm, 15, as this arm moves to various track positions on the disk surface. The stiffness of this cable, 43, and the friction in the ball bearings cause the frequency response of this structure to flatten out at a value of between 30 and 100 Hz (f1 in FIG. 17E). This lowers the gain of the servo control loop. In the configuration depicted in FIG. 17A, the frictionless pivot is formed by two flexural members, 83 and 85. These flexural members may be fabricated from a metallic or a non-metallic material to attain suitable damping characteristics. The plates have very low bending stiffness along the rotary actuator axis and much larger stiffness in a perpendicular plane. These different stiffness values are developed by designing the thickness of the flexural members 83 and 85 in the two orthogonal planes, namely, "t" and "b" as illustrated in FIGS. 17B and 17C. These flexural members are restrained by a central shaft 84 and are attached to the rotor 15.

Figure 17D:
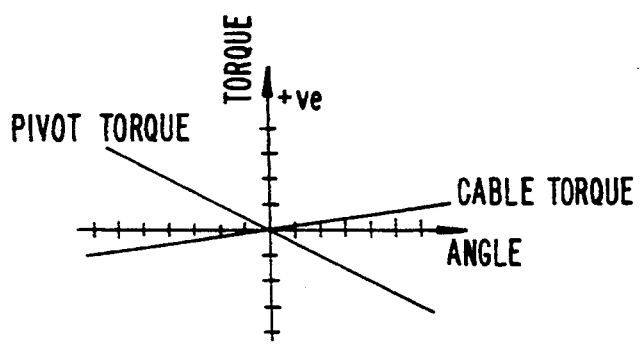
FIG. 17D is a graph of torque as a function of angle in the flexural members of the pivot of FIG. 17A.
Figure 17E:
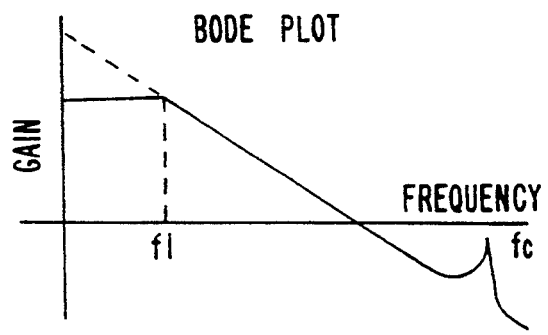
FIG. 17E is a graph of open loop gain of the actuator as a function of frequency for the pivot of FIG. 17A.

In a preferred arrangement the flexural pivot develops a zero torque about an inner radius of the disk, while the cable 43 has a zero torque at the outer radius, as shown in FIG. 17D. Under these conditions an equilibrium is attained close to the middle of the disk. The actuator is positioned at the point of equilibrium near the middle upon power-up and the magnetic latch (discussed below) is deactivated. A calibration of the servo loop for runout can be performed at this point. Furthermore, the stiffness of the flexural pivot and the inertia of the rotor 15 can be designed such that the resonant frequency of this assembly is much larger than the bandwidth of the servo control loop. A notch filter can be included in the servo compensator to keep this resonance peak below the zero "db" line. In another arrangement the resonant frequency can be designed to coincide with the sampling frequency of the servo system, whereby the notch of the sampler would act to nullify the structural resonance, fc, as shown in FIG. 17E. The advantage of utilizing such a pivot design is to achieve a lower product cost along with an improvement in the gain of the servo loop at frequencies below f1. In another embodiment of this arrangement, the torque variation of this pivot can be compensated for by a variation in the $K_T$ value of the actuator motor. This preferred variation of $K_T$ can be developed by a variable air gap in the motor developed either by variable thickness magnet or by forming the top plate 42 in a suitable manner.

Figure 11:
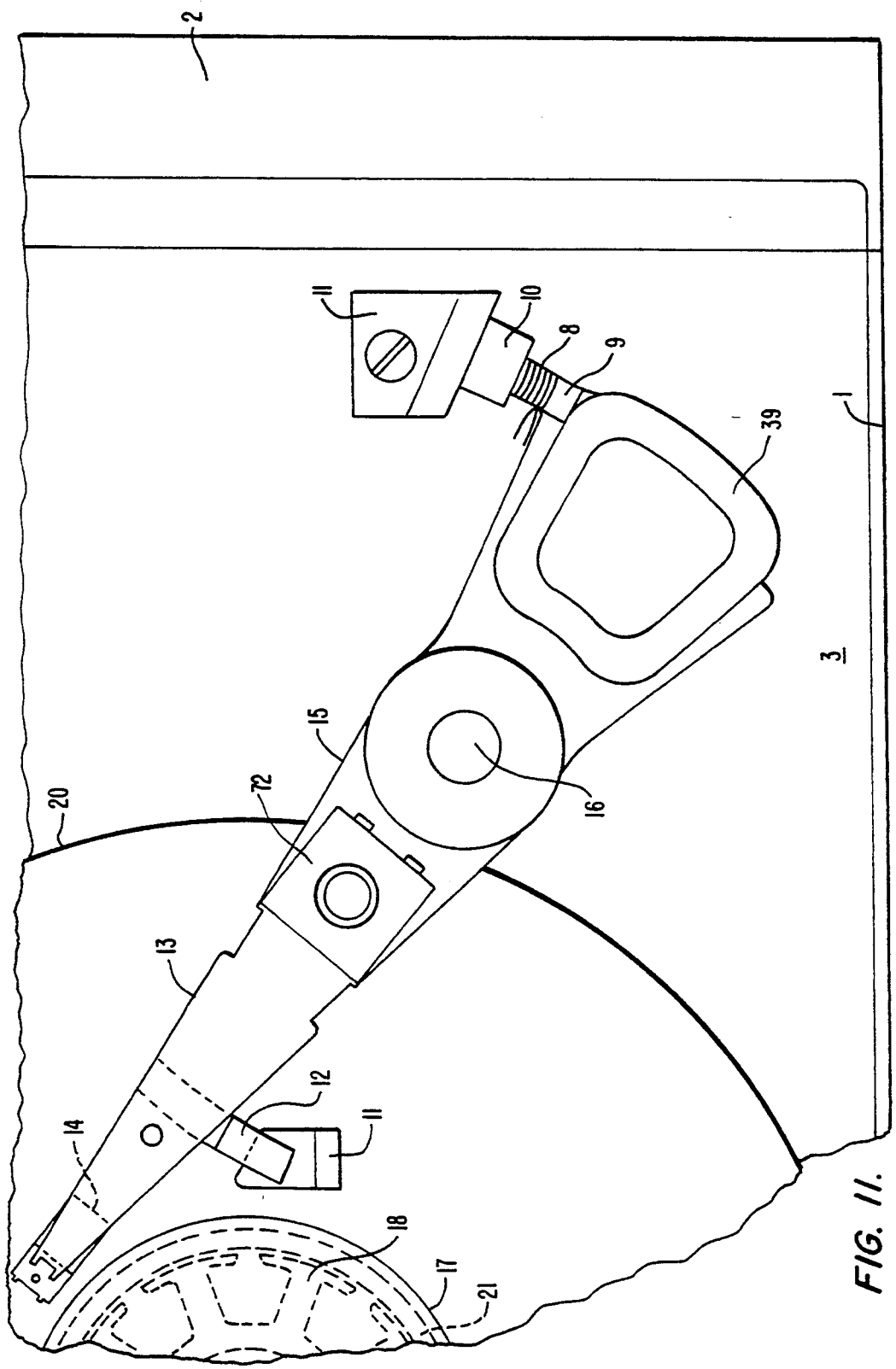
FIG. 11 is a top elevational view of a head unloading and locking mechanism for use with the rotary actuator of FIG. 10.
Figure 12:
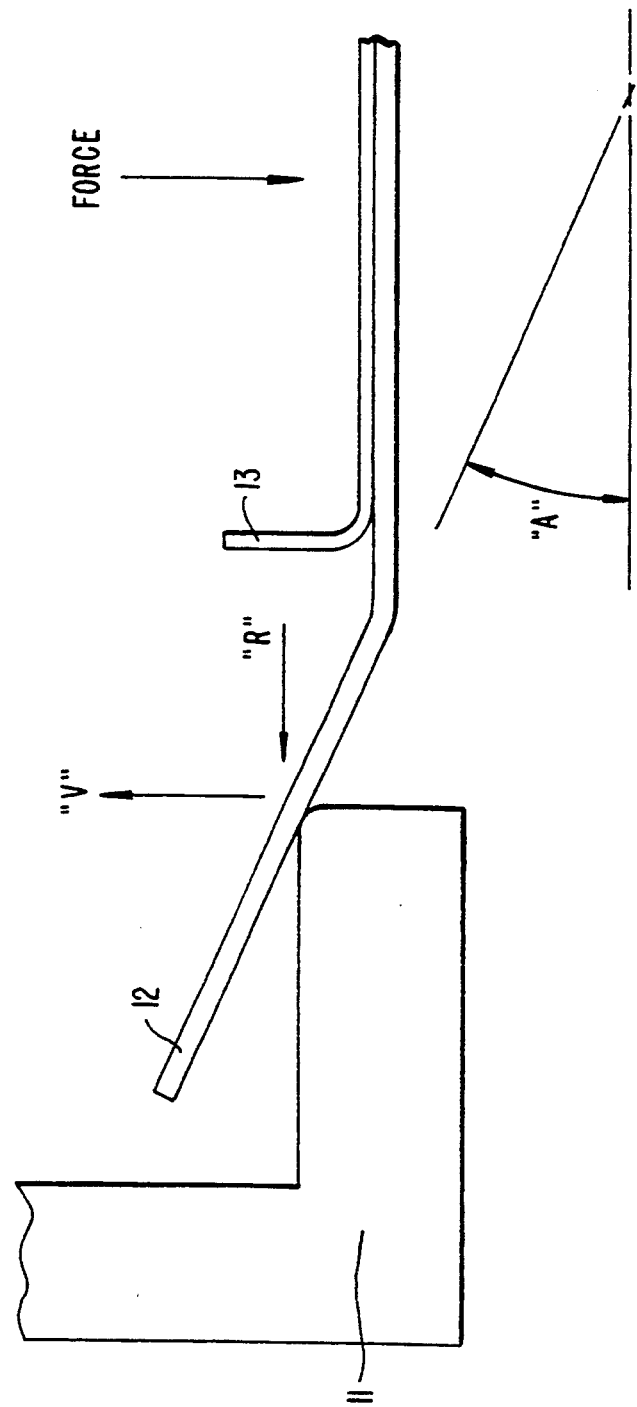
FIG. 12 is a side elevational view of the head unloading and locking mechanism of FIG. 11 illustrating the forces acting thereon.

The actuator, in a preferred embodiment, has a magnetic latch mechanism as illustrated in FIG. 11. When power is removed from the storage device the spindle motor energy is channeled into the actuator coil, 39, to drive the rotor, 15, such that the suspensions, 13, are driven onto a mechanical cam, 11, located on the top and bottom covers of the product, 31 and 32. A mechanical tab, 12, is attached to the suspension, 13, such that this tab can ride the cam, 11. The tab is formed with an angle "A" as illustrated in FIG. 12, such that a horizontal force, "R" will result in a vertical force, "V". This force can be used to unload the suspension, 31, from the disk surface and thereby, eliminate the potential of the smooth air bearing surface from sticking to the smooth disk surface. The value of the angle "A" is defined so that rapid motions attained during failure modes of the control electronics will not damage the suspension, 13. The rigidly mounted heads, 23 and 30, remain adjacent to the disks, 20. These heads have smooth and rounded edges as well as the disks have insignificant mass, so external shock forces will not damage the recording surfaces of either the disk or the head.

In a preferred embodiment, the magnetic latch, 10 and 11, is attached to the printed circuit board, In another embodiment, the magnetic latch is attached to the top cover, 31, of the product. The latch is made up of a permanent magnet, 10, and a mounting bracket, 11. A soft magnetic material, 9, is attached to the actuator rotor, 15. A coil of wire, 8, is wrapped around this soft magnetic piece such that a like magnetic pole, similar to the latch magnet, 10, is developed in this piece to appropriately negate the action of the magnet, 10, during periods when the rotor, 15, is operating within the vicinity of this magnet or upon power-up of the storage device. When power is removed from the storage device, the rotor, 15, will be driven close to the magnet, 10, so that it can be latched in position, as well as a force "R" developed to unload the head suspensions, 13. The use of the coil, 8, will allow this magnet, 10, to be large enough such that the product can sustain significant shock loads and not allow the suspension mounted heads, 14, to become unloaded from the cam, 11.

During power-on, for this embodiment, two operating modes are possible. In the first the spindle motor is energized with low power to orient it in a preferred configuration so that, when it is driven to rotate in the correct direction. The heads, 14, are moved off the cam, 11, and then full power is applied to the spindle motor. Over this short period the heads will not have time to stick to the disk surface (due to smooth finishes on each). In the second configuration the spindle rotor, 17, is driven until it reaches the specified speed. The disk, 20, will develop an air bearing film over the rigidly mounted head, 23 or 30. The thickness of this film will be fairly large due to the fact the heads, 14, are supported on the cam, 11. The disk will "fly away" from the head, 23 or 30, until the bending rigidity in the disk balances the forces applied by the air bearing film. The suspension mounted heads, 14, are then moved off the cam, 11. The air bearing film developed over the rigidly mounted head, 23 or 30, will cushion the dynamics of the heads, 14, until equilibrium is achieved. The existence of this large film along with rounded edges on all the heads will allow this operation to occur in a reliable fashion.

Figure 13A:
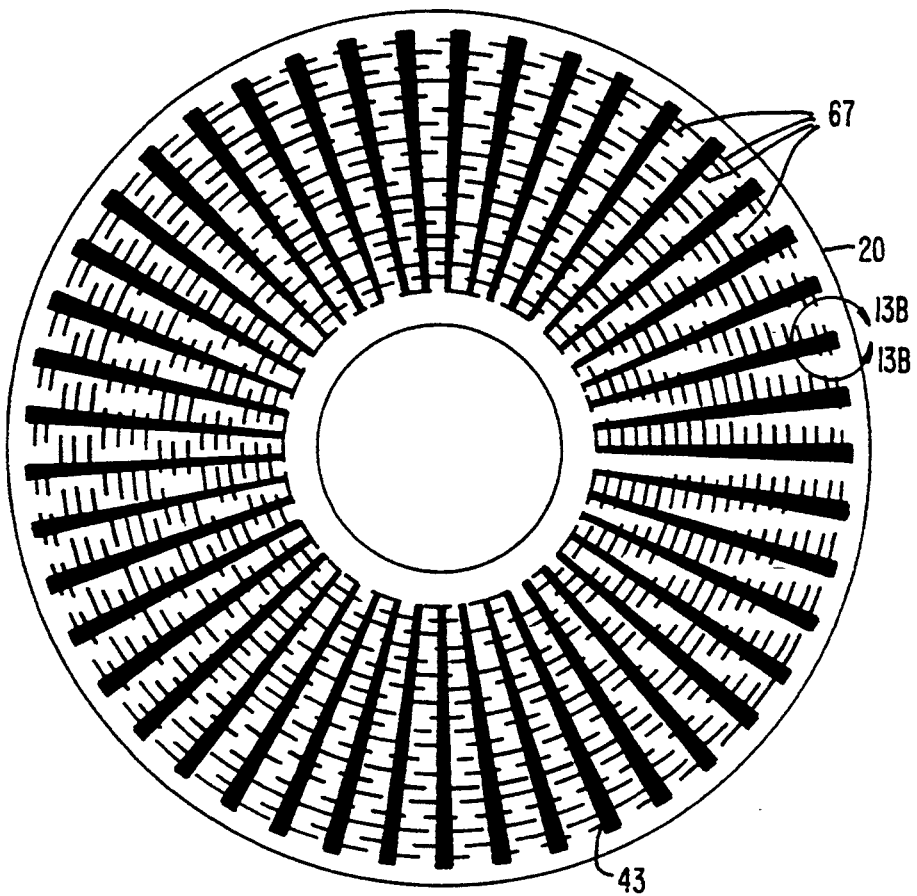
FIGS. 13A is a top elevational view of a typical disk illustrating the embedded servo format utilized in disk drive products.
Figure 13B:
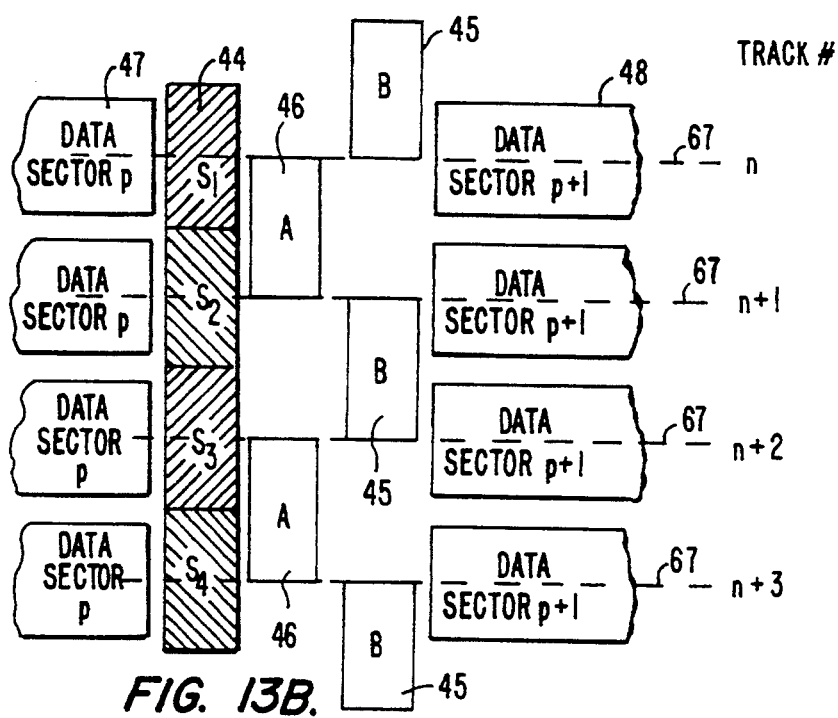
FIG. 13B is a magnified view of a data sector in the disk of FIG. 13A.

FIGS. 13A and 13B illustrate an embedded servo format utilized in disk drive products. It consists of specific information written at equal intervals around the disk circumference, from an outer radius on the disk to an inner radius. The details of this servo pattern is shown in FIG. 13B. Constant frequency transitions are encoded in a grouping labelled "A" and another labeled "B". The burst patterns "A", 46, and "B", 45, are centered in between the data tracks, 67. These patterns are preceded by unique patterns, 44, labeled "S1" to "S4" in the figure, that contain a grouping of unique length magnetic transitions that are used to signal the occurrence of the servo bursts as well as additional transitions that encode a "gray code" numbering system to identify each of the constant frequency transition sets, 46 and 45, from another set. The data tracks are identified when the recording head samples equal amplitudes of the burst 46 and the burst 45. An off-track condition is signalled when these amplitudes differ in magnitude. The direction of this off-track is determined by which burst amplitude is larger compared to the other, along with the decoded "gray" code values.

Figures 14A, 14B:
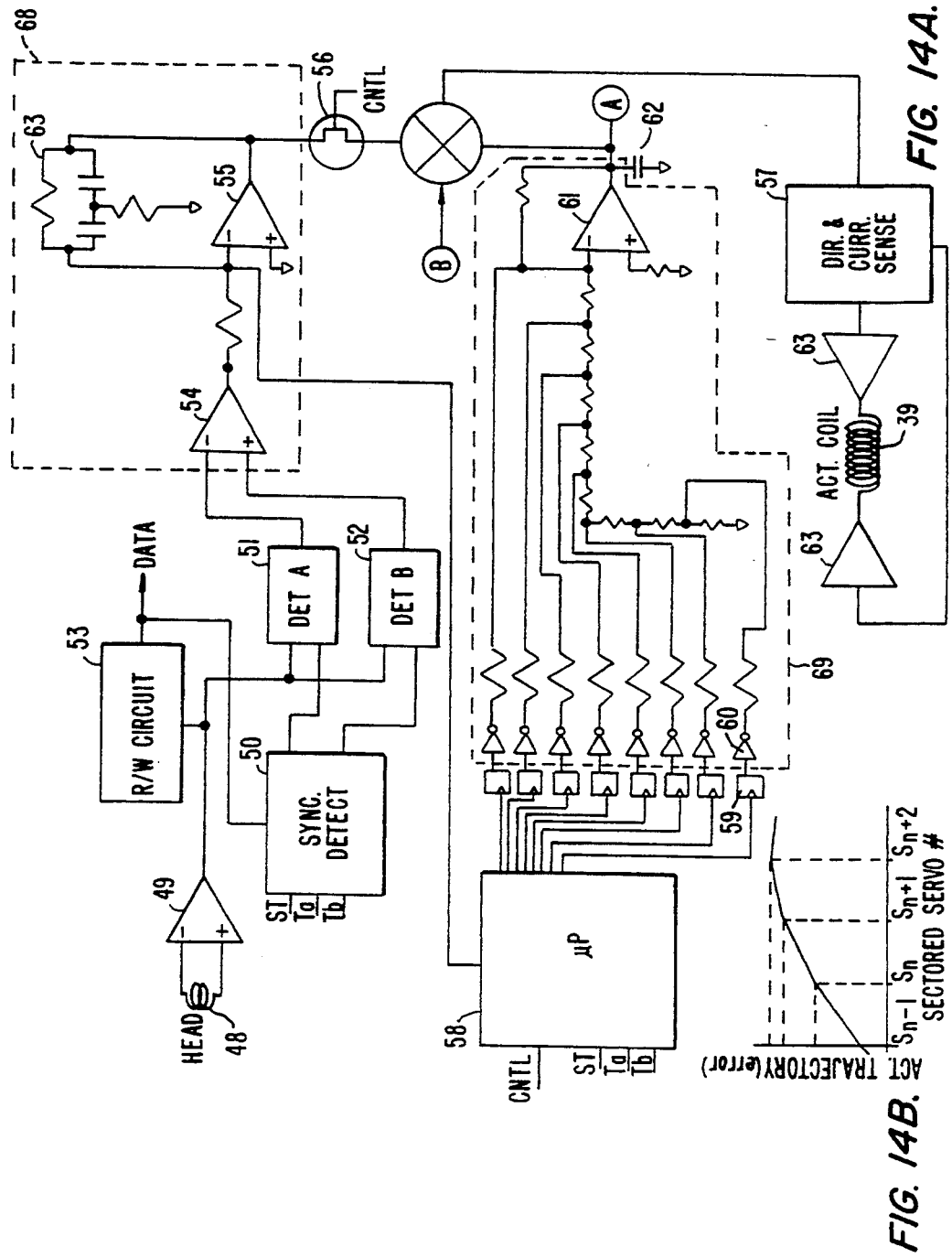
FIG. 14A is a circuit schematic of the servo control loop for the data storage device of FIG. 1.
FIG. 14B is a graph of the positioning error of the head as a function of servo burst number for the servo control loop of FIG. 14A.

FIG. 14A is a preferred arrangement of a servo control system of the storage device. All the data on the track is read by the head coil, 48. This is amplified by circuits, 49, and passed on to the Read/Write electronic modules defined as, 53, and also to some logic circuits, 50, that decode the unique transitions to signal servo detect and the generation of control signals to activate peak detector circuits 51 and 52. These peak detectors sample the amplitude of the constant frequency bursts "A", 46, and "B", 45 respectively. An analog servo compensator circuit is shown in the figure composed of elements 54, 55 and 63. This configuration can also be developed in the microprocessor, 58, such that an A/D convertor changes the position error signal into digital form, and the basic functionality of the circuit block, 68, is performed using digital techniques, commonly referred to a DSP module in the microprocessor, 58. The output is converted back to analog using a D/A module. The corrective actions of the servo loop are then fed to the actuator coil, 39, by the driver circuit elements, 57 and 63.

As discussed above, the disk drive of this disclosure may contain disks, 20, that are made from materials that have anisotropic characteristics. These disks exhibit thermal and hygroscopic expansions that vary in magnitude among the two principal material axes, also stress relaxation of the base material may occur resulting in off-track errors that are slow moving, but of significant magnitude. Another component is the repeatable runout of the spindle motor, as described earlier in this disclosure. A special control path is developed as illustrated in FIG. 14B, wherein, at power-on, the off-track errors are sampled over about 10 to 20 revolutions at a prescribed track on the disk, 20. This can be a middle track on the disk, to achieve an average off-track value for the entire disk. The off-track numbers are stored in RAM of the microprocessor to define a rough trajectory that the actuator would need to describe to follow the actual track on the disk surface. A switch, 56, is included in the servo loop to test these RAM values, such that the off-track values of, say, the (n+1)th burst is loaded into an 8 bit register, 59, at the time the head passes the nth burst. The values in the register, 59, are converted to analog using a D/A convertor, 69, which in this illustration is shown in discrete form. The capacitor, 62, charges or discharges depending upon the value placed in the 8 bit register, with a time constant, so that a trajectory is developed for the rotary actuator, 15. This can also be done by the microprocessor, 58, however, the microprocessor would then be entirely dedicated to this operation and may not have time for other control functions in the product. This scheme becomes a "look-ahead" servo, where the microprocessor, 58, anticipates the destination and attempts to reach the destination in a controlled manner. The value of the capacitor, 62, may be small or large depending upon the frequency response of the actuator coil and the rotor inertia. One objective of the present invention has been to develop a storage device that is ultra thin, and which, consequently, has a small rotor inertia.

As a further enhancement, since anisotropic and stress relaxation effects are slow moving, the RAM values in the microprocessor can be updated with appropriate corrections as the product continues to operate. These updates can be accomplished using an algorithm in which the microprocessor takes the instantaneous off-track error after the compensator, 68, divides it by a suitable factor using a right shift operation, so as to maintain a low firmware overhead, and adds this to the current values in RAM at each servo burst location. This divisor could be configured as a low pass filter to change these RAM values slowly and not interfere with the operation of the servo loop.

Figure 18A:
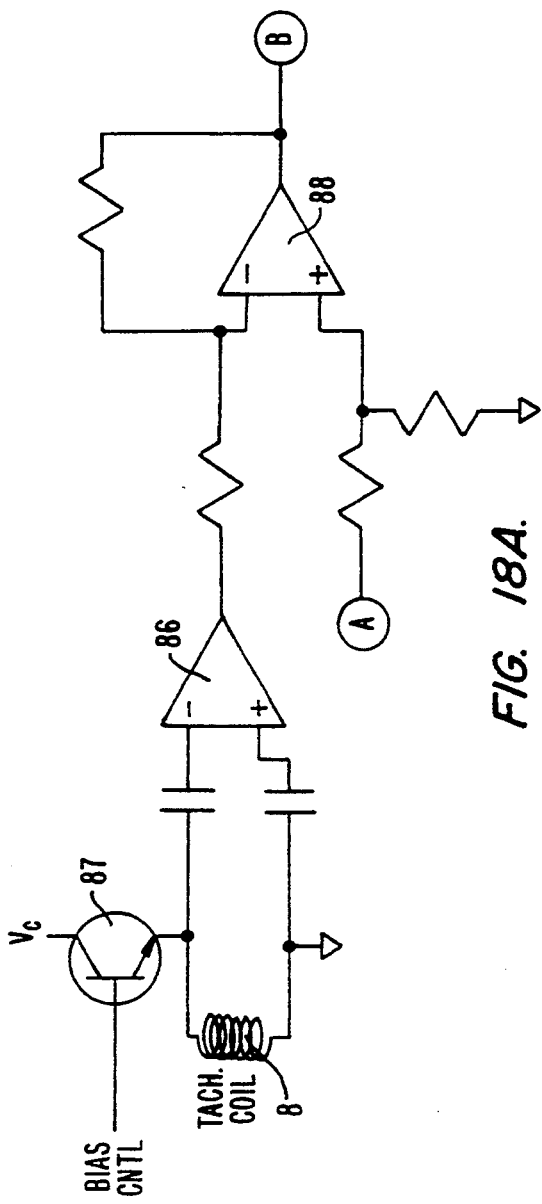
FIG. 18A is a circuit schematic of a velocity tachometer in the data storage device of FIG. 1.

The storage device of the present invention may be subjected to large operating shock and vibration disturbances. For such environments the coil 8 described earlier may be utilized as a velocity tachometer. During normal operation this coil would be displaced over the actuator magnets, 40. Motion of the actuator would result in some output from the coil, 8. This output can be subtracted from the actuator trajectory described earlier, as shown in FIG. 18A. The trajectory output from the capacitor 62 is also fed into a difference amplifier 88, through the path "A" as shown in the figure. The other input to this amplifier is the output of the coil appropriately conditioned by an amplifier 86. The coil is AC coupled to this amplifier such that bias currents in the coil do not effect the operation of this circuit. The output of 88 labeled "B" in the figure is connected to the summing junction of the servo control loop.

Figure 18B:
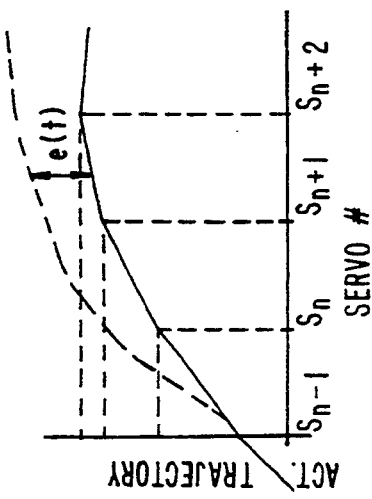
FIG. 18B is a graph of the look-ahead trajectory of the velocity tachometer of FIG. 18A as a function of servo samples.

Shocks incident on the storage device have little influence on the data track positions, due to insignificant mass of the disk and the stiff spindle bearing arrangement. The most significant effect of these disturbances is on the actuator 15. Motion of the rotor would be manifest as an off-track error, e(t), at the amplifier 88, illustrated in FIG. 18B. This error would then cause the driver circuits 57 and 63 to provide a corrective input to the actuator coil 39. Thus, the coil 8 allows the servo system to be sensitive in areas where the embedded servo information is not available. An arrangement such as this can operate in significantly harsher environments than a typical hard disk drive apparatus.

Figure 15A:
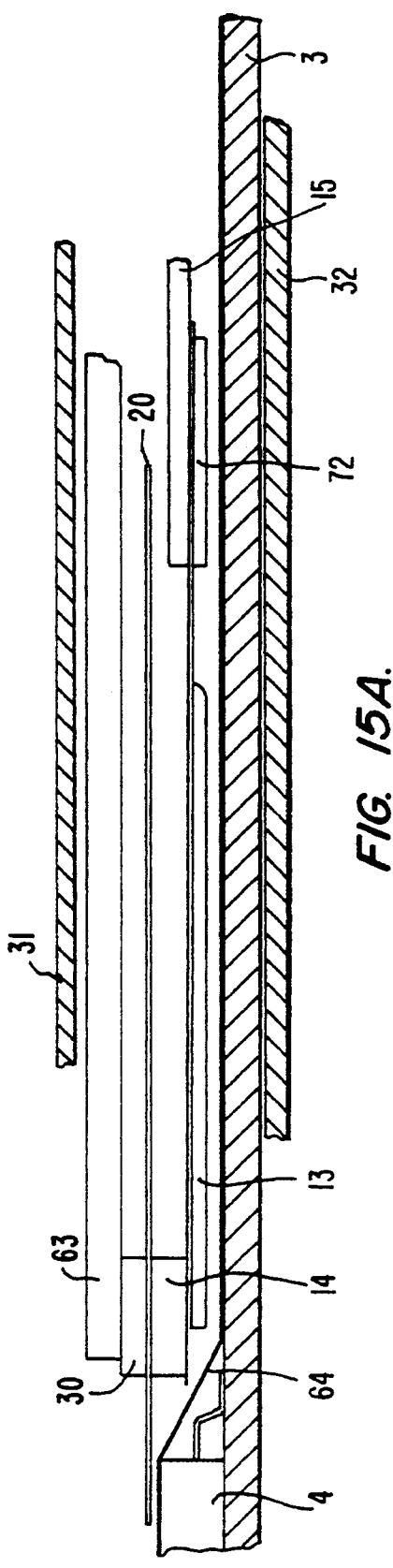
FIGS. 15A and 15B are side cross-sectional views of the data storage device of FIG. 1 in a single disk embodiment and a two-disk embodiment, respectively.
Figure 15B:
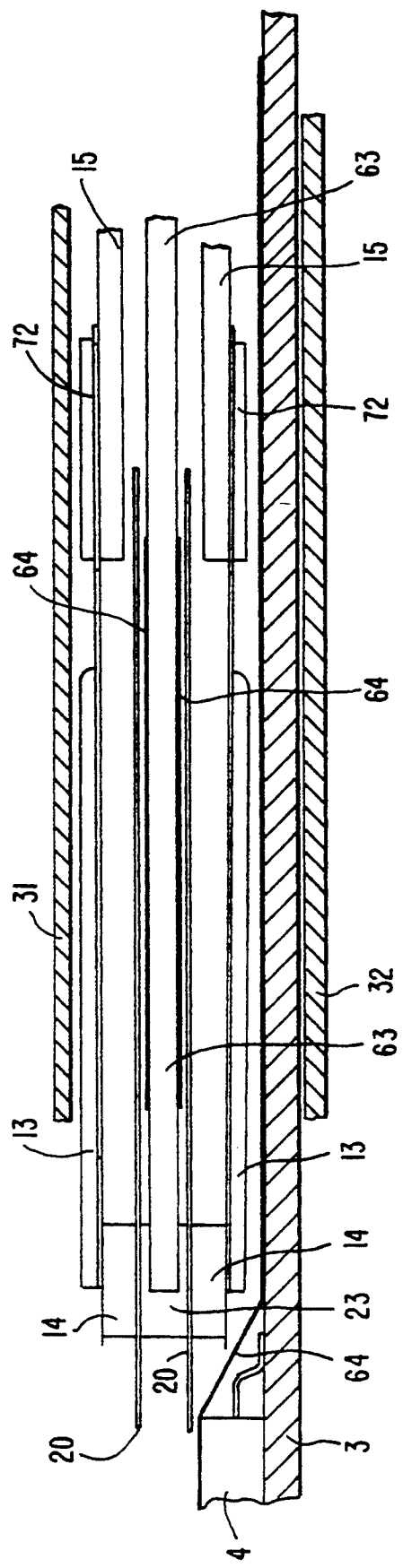

A preferred embodiment of the layout of the storage device of the present invention is illustrated in FIGS. 15A and 15B. The compliant characteristics of head/disk interface along with its contaminant resistance is utilized to package the electronics in the same module as the recording components. The low mass of the disks and the lower friction of the air bearing is used to create smaller spindle motors that can be mounted onto the electronic circuit board, 3.

Additionally, the finished printed circuit board, 3, is covered with a woven fabric liner material similar to that used in floppy diskettes to clean the disks, 20, and capture contaminants during the life of the product. This liner material is also attached to the surface of the top cover, 31, that is closest to the disk surface. In the two disk configuration, liner material can also be attached to the rigid rotor arm, 63, to clean the inner surfaces of the disks, 20.

Out gassing of the PCB can be arrested by utilizing a conformal coating on the PCB prior to assembly, and if necessary, this coating can also be applied after the IC's, 4, are assembled and the circuit board tested, or in another configuration the liner material could be attached using double sided tape or equivalent material to encapsulate the entire circuit board, 3. The last two alternatives may create problems in heat dissipation from the IC's, and consequently, some holes can be provided in the adhesive film, particularly around the IC's, so that heat transfer can occur readily.

The top and bottom covers, 31 and 32, of the drive can be made from metal or plastic injection molding. In the case of a plastic housing a metallic mesh can be attached to the surfaces of the undersides of these covers to provide RF shield in the product. This mesh can also be "insert molded" into the plastic for additional rigidity along with electric shielding. Alternatively, a metal shield, similar to floppy heads, can be configured locally around the recording heads to achieve the necessary RF shielding, and not include the wire mesh in the housing of the product for lower material cost and ease of assembly.

In a specific embodiment, the package height of the single disk device of FIG. 15A is based upon the following component specifications. The top cover, 31, thickness is 0.38 mm at the location where the actuator arm would move, a clearance of 0.25mm is provided between these components, so they do not interfere during operation. The thickness of the rigid arm, 63, and the recording head, 30, is about 1.1 mm. The disk, 20, is 0.076 mm. The bottom cover, 32, is 0.635 mm thick, a clearance of 1.2 mm is provided until the head mount, 72, which is 0.3 mm thickness. The dimension from this latter surface to the disk, 20, surface, namely, the height of the head assembly, 14 and 13, is 0.965 mm. This results in a vertical product height of 5.0 mm. The clearance between the disk, 20, surfaces and the rotor arms is maintained at about 0.35 mm in this arrangement. The PCB, 3, is 0.8 mm, with IC's that have a vertical height of 1.4 mm. The PCB, is mounted onto the bottom cover, 32, and the clearance between the top of the IC's, 4, and the disk, 20, surface is 0.3 mm. A fabric liner is installed over the entire PCB assembly as discussed earlier. Tolerance build-up problems in areas where the IC heights are such that an interference could occur with the disk surface due to IC mounting tolerances and non-flatness/warpage of the PCB can be accommodated by the flexibility of the disk, 20, and the intervening fabric liner. An air bearing film would form and the disk would flex away in these local areas such that the magnetic coating on the disk is not harmed.

The two-disk version is configured with similar components and is detailed in FIG. 15B. The width of the central head, 23, is 1.1 mm. The thickness of the central rigid rotor arm, 63, is 0.7 mm. This gives the arm a vertical stiffness of over about 28 pounds/inch and more than 3000 pounds/inch in the transverse direction parallel to the disk surface (the plane in which the actuator execute seeks to the various tracks). The package height of this configuration is approximately 6.2 mm.

From FIGS. 15A and 15B it can be seen that component thicknesses can be changed to configure lower form factor products. Additionally, more disks can be included in the drive, such that in typical hard disk product heights of 10 mm and 12.5 mm, extremely large storage capacities can be developed at a much lower cost.

It is also possible to mount the storage device of the present invention on a computer "mother board". The size of the disk can be made small such that this storage device can have the form factor of a 386 or 486 microprocessor both in foot print as well as in vertical height, to develop extremely thin and portable computer systems.

One additional advantage of using Mylar disks in the storage device is that any disk size can be fabricated very economically compared to hard disks. Hard disk drives require the creation of high-precision substrates using specialized substrate-fabrication methods and equipment. Changes in hard disk substrate size require changes throughout the entire substrate fabrication industry, with the result that product form factors remain quite rigid.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A data storage device comprising;
   a housing;
   a motor having a rotatable spindle;
   at least a first and a second flexible disk separated from each other along a rotational axis of the spindle and disposed to rotate with the spindle, the first and second disks having first and second recording surfaces;
   a first head mounted between the first and the second disks, the first head being movable in a radial direction along the disks, the first head having a first air bearing surface that is adjacent to the first recording surface of the first disk, the first head having a second air bearing surface that is adjacent to the first recording surface of the second disk, the first and second air bearing surfaces of the first head having an air film separating the first head from the first recording surfaces of the first and second disks during operation;
   a second head having an air bearing surface adjacent to the second recording surface of the first disk, the second head being suspension mounted to substantially oppose the first air bearing surface of the first head and to provide a force that urges the first disk towards the first air bearing surface of the first head and creates an air film separating the air bearing surface of the second head from the second recording surface of the first disk during operation; and
   a third head having an air bearing surface adjacent to the second recording surface of the second disk, the third head being suspension mounted to substantially oppose the second air bearing surface of the first head and to provide a force that urges the second disk towards the second air bearing surface of the first head and creates an air film separating the air bearing surface of the third head from the second recording surface of the second disk during operation; and
   at least one of the three heads containing a recording transducer to write and read information to and from at least one of the disk surfaces.

2. A data storage device as in claim 1, wherein the first head has a recording transducer aligned to the first air bearing surface and a second recording transducer aligned to the second air bearing surface.

3. A data storage device as in claim 2, wherein the recording transducer aligned to the first air bearing surface of the first head is displaced spatially from the recording transducer aligned to the second air bearing surface of the first head so as not to interfere with signals recorded by each other.

4. A data storage device as in claim 1, wherein the recording transducer on the first air bearing surface of the first head is spatially displaced from the recording transducer in the second head so as not to interfere with signals recorded by each other.

5. A data storage device as in claim 1, wherein the recording transducer on the second air bearing surface of the first head is spatially displaced from the recording transducer in the third head so as not to interfere with signals recorded by each other.

6. A data storage device as in claim 1, wherein the second recording head is movable in a plane perpendicular to the mounting plane of the first disk.

7. A data storage device as in claim 1, wherein the third recording head is movable in the plane perpendicular to the mounting plane of the second disk.

8. A data storage device as in claim 1, wherein a portion of the first disk between the first air bearing surface of the first head and the air bearing surface of the second head is deflectable to allow contaminants to pass therethrough.

9. A data storage device as in claim 1, wherein a portion of the second disk between the second air bearing surface of the first head and the air bearing surface of the third head is deflectable to allow contaminants to pass therethrough.

10. A data storage device as in claim 1, wherein the first and the second flexible disks have a non-dimensional stiffness value larger than 0.005.

11. A data storage device as in claim 1, wherein the first and second flexible disks have cutouts along an inner diameter, the cutouts extending radially outward from the inner diameter.

12. A data storage device as in claim 1, wherein the distance between the first and second air bearing surfaces of the first head is smaller than the distance between the first and second flexible disks on the spindle.

13. A data storage device as in claim 1, wherein the first air bearing surface of the first head is composed of at least two longitudinal rails, one of the rails having at least two longitudinal slots, the second air bearing surface of the first head also having at least two rails with at least two slots in the rails that oppose the non-slotted rails of the first air bearing surface;

the second head air bearing surface composed of at least two rails with at least two slots in the rail that are substantially opposite the non-slotted rails of the first air bearing surface of the first head;

the third head air bearing surface composed of at least two rails with at least two slots in the rails that are substantially opposite the non-slotted rails of the second air bearing surface of the first head;

at least one recording transducer mounted in at least one of the heads and extending into one of the rails thereby forming the two slots of the slotted rail;

whereby the disks are oriented to allow very low spacing at the point where the recording transducer is mounted and high spacing at other points when the disks are in operation.

14. A data storage device as in claim 13, wherein recording transducers are mounted in each of the heads so that each air bearing surface has at least one transducer extending into one of the rails.

* * * * *